(12) United States Patent
Chamberlain

(10) Patent No.: US 8,966,438 B2
(45) Date of Patent: Feb. 24, 2015

(54) SYSTEM AND METHODS FOR END-USERS TO GRAPHICALLY PROGRAM AND MANAGE COMPUTERS AND DEVICES

(71) Applicant: Mark Spencer Chamberlain, Issaquah, WA (US)

(72) Inventor: Mark Spencer Chamberlain, Issaquah, WA (US)

( * ) Notice: Subject to any disclaimer, the term of this patent is extended or adjusted under 35 U.S.C. 154(b) by 0 days.

(21) Appl. No.: 13/907,952

(22) Filed: Jun. 2, 2013

(65) Prior Publication Data

US 2014/0359558 A1    Dec. 4, 2014

(51) Int. Cl.
| G06Q 40/00 | (2012.01) |
| G06F 3/00 | (2006.01) |
| G06F 9/44 | (2006.01) |
| G06F 9/45 | (2006.01) |

(52) U.S. Cl.
CPC .. *G06F 8/34* (2013.01); *G06F 8/35* (2013.01); *G06F 8/20* (2013.01)
USPC ............. 717/105; 705/37; 715/740; 715/762; 715/771; 717/108; 717/109; 717/124; 717/144

(58) Field of Classification Search
CPC . G06F 17/21; G06F 17/248; G06F 17/30699; G06F 17/30867; G06F 17/30592; G06F 17/30893; G06F 9/5072; G06F 11/3688; G06F 8/24; G06F 8/34; G06F 8/71; G06Q 10/063
See application file for complete search history.

(56) References Cited

U.S. PATENT DOCUMENTS

| 5,613,117 | A * | 3/1997 | Davidson et al. ............. 717/144 |
| 7,272,820 | B2 * | 9/2007 | Klianev ......................... 717/109 |
| 7,779,386 | B2 * | 8/2010 | Seitz et al. .................... 717/108 |
| 7,890,806 | B2 * | 2/2011 | Kwong et al. ................ 717/124 |
| 7,904,817 | B2 * | 3/2011 | Bergantino et al. ........... 715/740 |
| 2004/0243605 | A1 * | 12/2004 | Bernstein et al. ............. 707/100 |
| 2005/0149908 | A1 * | 7/2005 | Klianev ......................... 717/109 |
| 2006/0265629 | A1 * | 11/2006 | Kwong et al. .................. 714/38 |
| 2007/0112574 | A1 * | 5/2007 | Greene ............................ 705/1 |
| 2008/0134073 | A1 * | 6/2008 | Bergantino et al. ........... 715/771 |
| 2014/0025549 | A1 * | 1/2014 | Kline et al. ..................... 705/37 |
| 2014/0075345 | A1 * | 3/2014 | Fippel ........................... 715/762 |

* cited by examiner

*Primary Examiner* — Don Wong
*Assistant Examiner* — Anibal Rivera

(57) ABSTRACT

A system that enables end-users who are not skilled in the art of traditional computer programming to intuitively program, configure and manage computers and devices and/or systems that contain many computers and devices. End-users connect graphical parts using graphical wires using a graphical user interface. The timing of the messages that are carried in the wires that connect the parts is deterministic, consistent and intuitive to the end-user. Parts and their user-configurable features are typically designed, fully tested and certified by the original equipment manufacturer or independent software vendor. This invention relates to ubiquitous computing, a model of human-computer interaction in which information processing has been thoroughly integrated into everyday objects and activities associated with those objects.

56 Claims, 20 Drawing Sheets

FIG. 2. Example of a NCE being used to develop an application for another NCE

Internal Anatomy of a Part Instance

FIG. 4. Master Control Program State Diagram

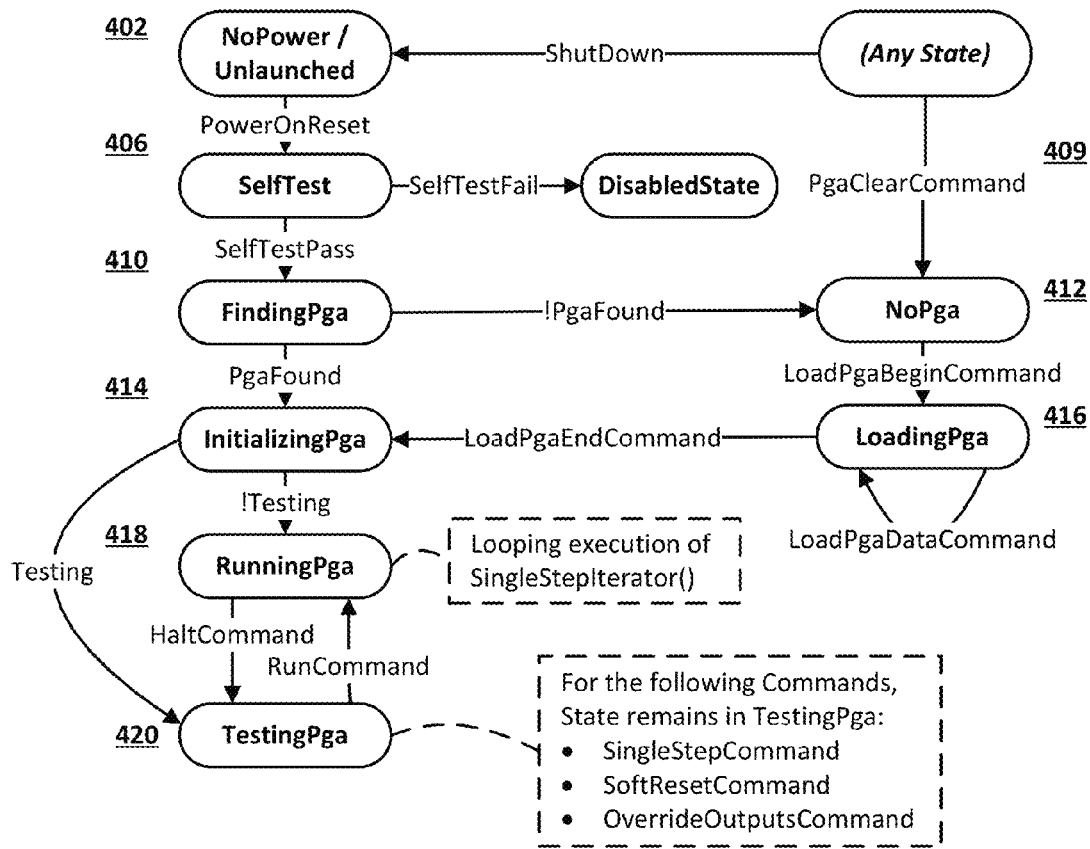

If self test fails, resulting state is either DisabledState, or one of the above states, depending on the self test outcome. Failure state can be determined via StatusCommand or other indicator such as LED. A failed state can engage an alternate backup mechanism such as in Fault Tolerant systems.

Any state can respond to StatusCommand by returning the current status of the PGA.

State diagram legend

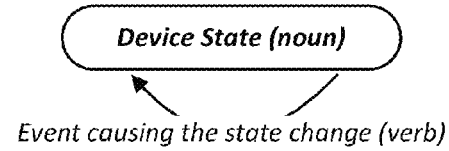

Event causing the state change (verb)

Acronym Legend:
PGA = Part Graph Application

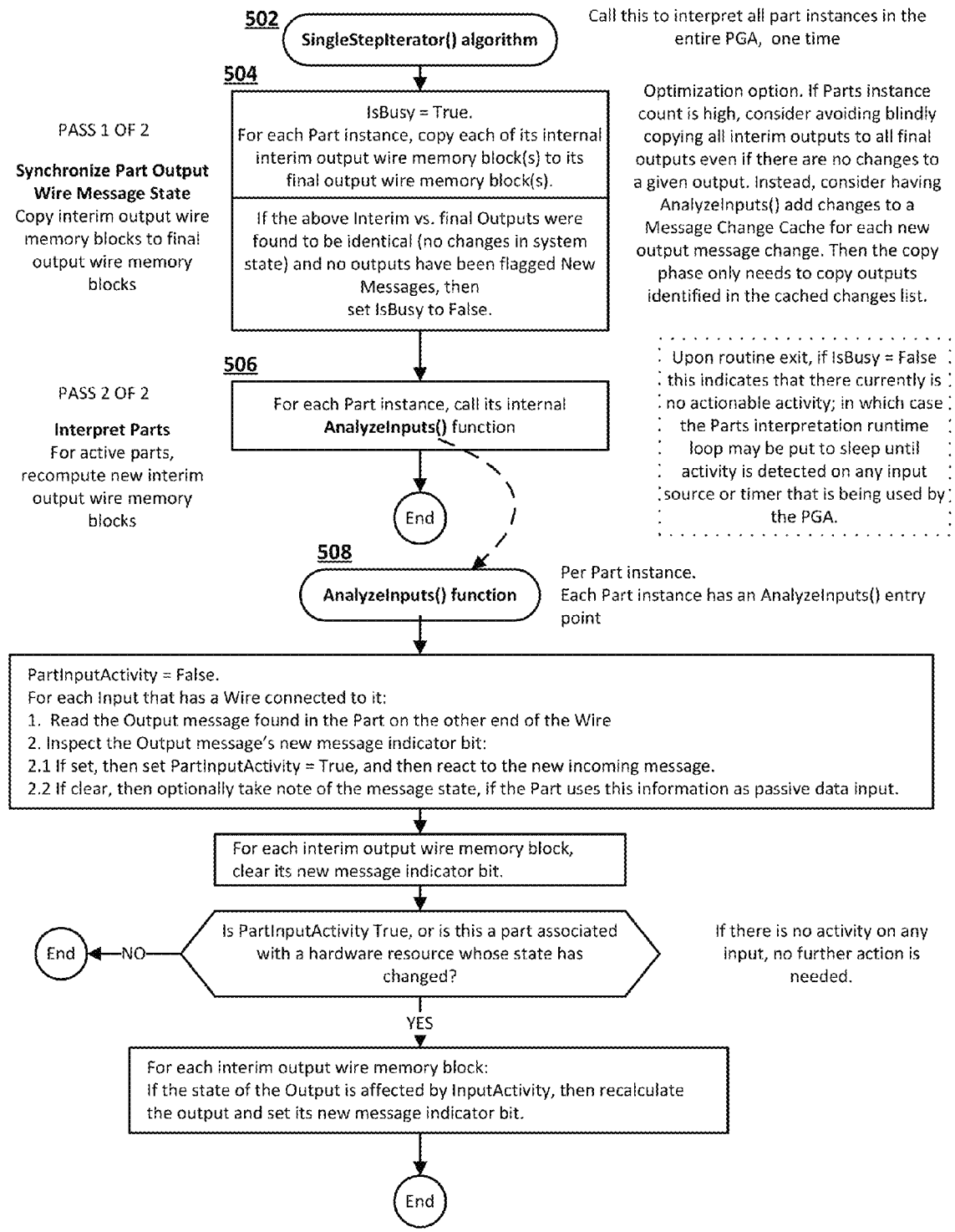
FIG. 5. Example: Master Control Program interpreting Part Instances within a PGA

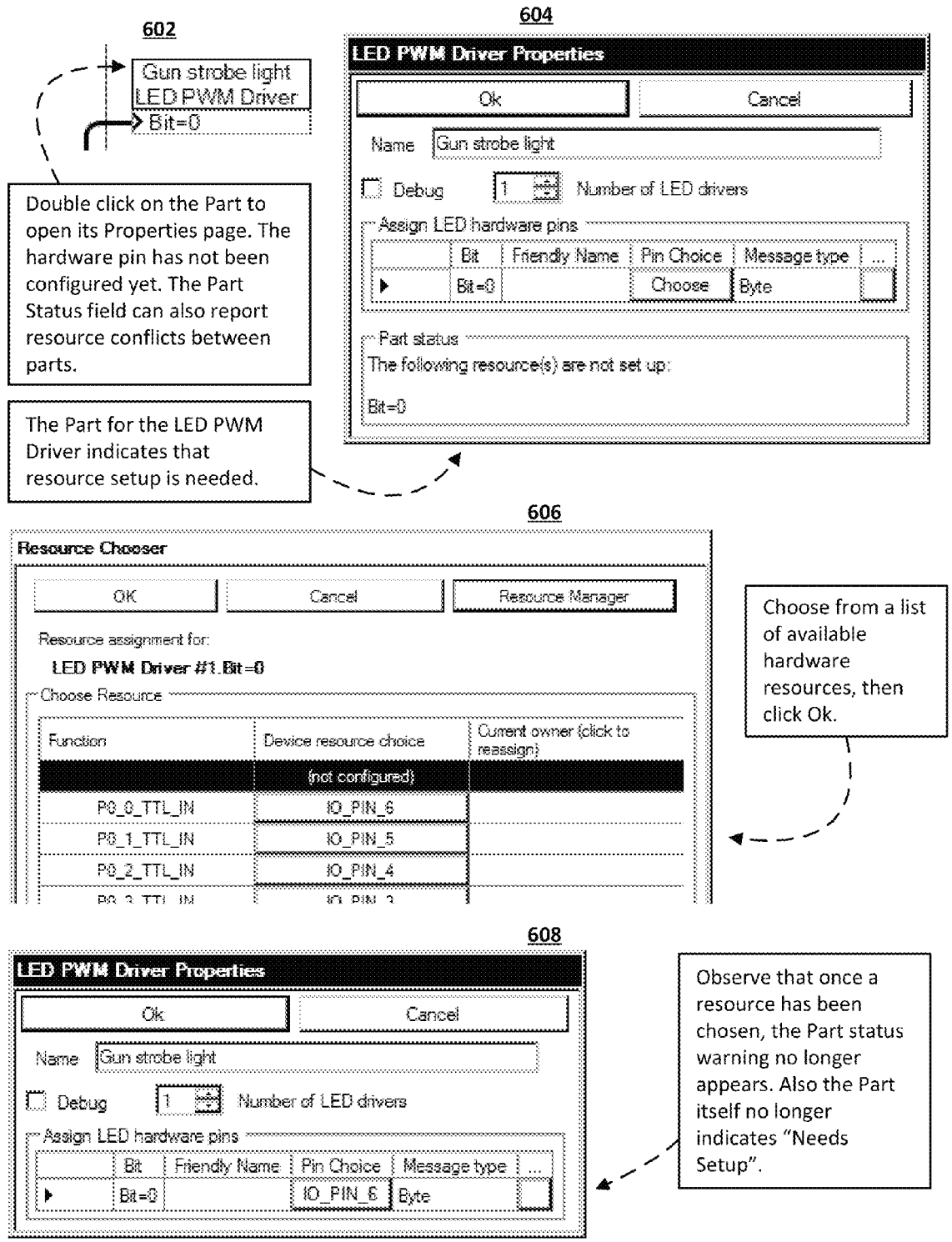
FIG 6. PGA Physical Resources Management

FIG. 7A. Managing resource conflicts between Resource Parts

702

Binary Input Properties

[ Ok ]  [ Cancel ]

Name  [Binary Input #1]

☑ Debug  [0]  (milliseconds) Debounce filter

Part output message

| | Formal Name | Friendly Name | Message Type | ... |
|---|---|---|---|---|
| | IO_PIN_46 | | Bool | |

Resource requirements

| Name | Description | Choice |
|---|---|---|
| TTL logic input | TTL (digital) input pin | IO_PIN_46 |

Part Status 704
This part conflicts with physical setup requirements of other part(s).
Delete one or more parts, or adjust part settings.

1.1 For part Binary Output #1: Switch S1 must be set to OFF
1.2 For part Binary Input #1: Switch S1 must be set to ON FIG. 7B. Reporting Physical Setup Requirements In this example, the Visual Part Graph Application Designer tool automatically generates setup instructions for the user.

```
Device Setup Instructions

These instructions apply to the following Part Graph Application: MyPga.pga

Before installing MyPga.pga into the device, verify the following steps have
been completed to ensure the device functions correctly and is not damaged.

Ensure you have satisfied the following system environment requirements:

1. Connect a Debug Dongle to the debug port
2. Ensure that at least 10 KB device RAM is installed
3. Establish a Bluetooth wireless connection to a Windows Phone device
4. Establish a USB connection to the PC Ensure that you have connected hardware to device pins in accordance with the
Pin Purpose table below:

Pin  Purpose                                Part name involved   Comments
---- -------------------------------------- -------------------- --------
P1.6 Output: LED driver, 20mA max current   Left wing light
P1.7 Input:  Analog input 0-5V              Temperature Ensure that the device switches and jumpers are configured as follows:

Switch  Setting                         Part name(s) involved   Comments
------  ------------------------------  ----------------------  --------
S1      ON
S2      DEBUG
S3      Position 3
S4      (don't care)

Jumper  Setting                         Part name(s) involved   Comments
------  ------------------------------  ----------------------  --------
J1.A    ON  (Jumper installed)
J2      OFF (Jumper removed)
J3      (don't care)
J4      (don't care)
```

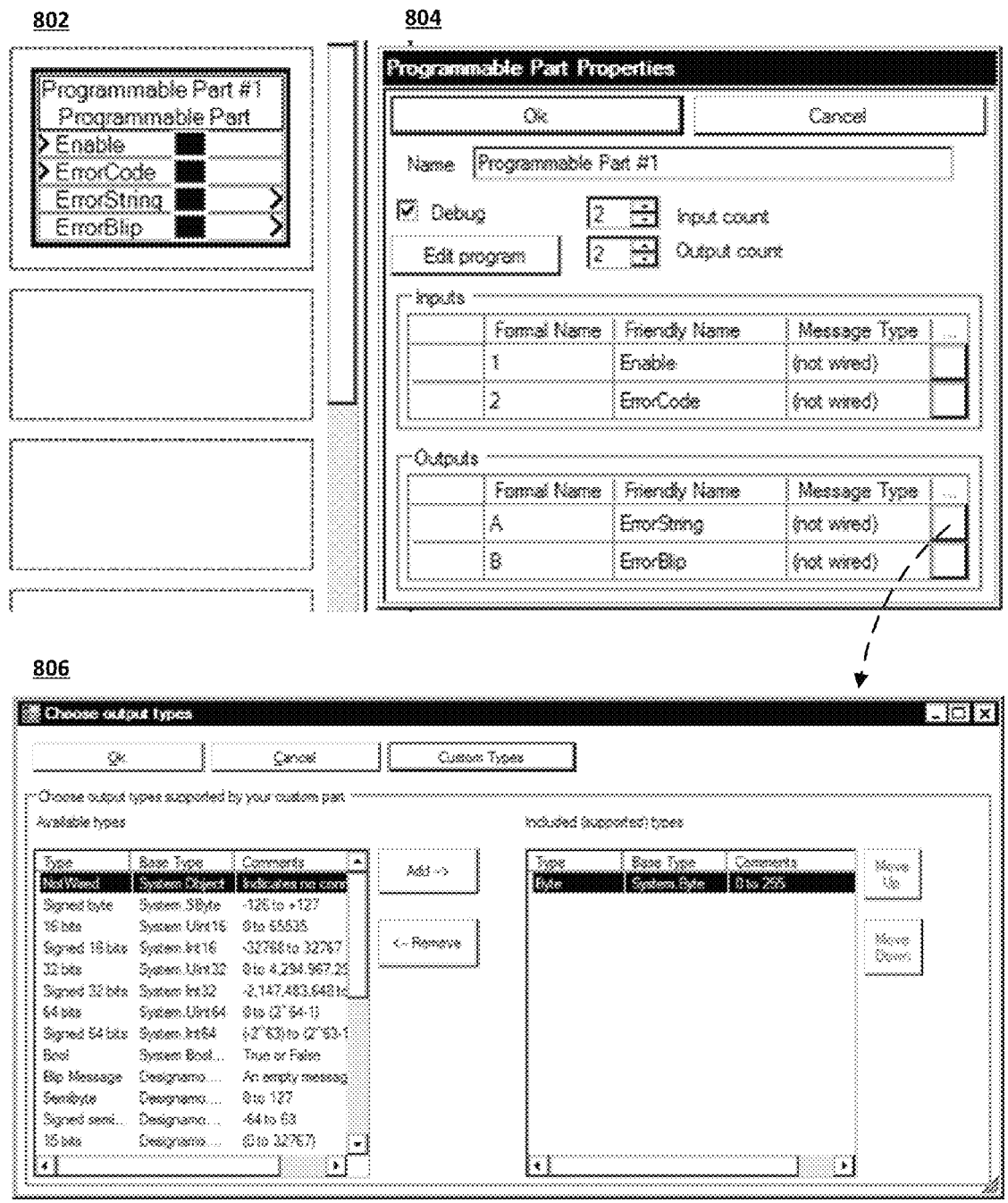
FIG. 8A. The Programmable Part

FIG. 8B. Programmable Part Script example

```
#region PGA Designer generated code - do not modify
//--------------------------------------------------------------------
// Part Input Terminal definitions generated by Property Page settings
Input I_Enable
  = new Input(new Type[] { typeof(System.Byte), typeof(System.Int32) });
Input I_ErrorCode
  = new Input(new Type[] { typeof(System.Byte), typeof(System.Int16),
    typeof(System.Int32) });

// Part Output Terminal definitions generated by Property Page settings
Output O_ErrorString = new Output(new Type[] { typeof(System.String) });
Output O_ErrorBlip = new Output(new Type[] { typeof(V_MSG_Blip) });
endregion // An example part-specific Compute function written by the end-user.
// PURPOSE
// When this Part receives a numeric ErrorCode, with the Enable input
// nonzero when the new ErrorCode arrives, the Part emits an ErrorString
// that corresponds to the ErrorCode. It also emits an ErrorBlip output.
// As determined by Properties Page of the Part, the Enable message may
// be a Byte or an Int32; the ErrorCode may be a Byte Int16, or Int32.
void Compute()
{
    // Insert custom code here.
    Boolean Enabled = false;
    Int32 ErrorCode = 0;

string[] MessageStrings = new string[]
    {
        "First Message",
        "Second Message",
        "Third Message",
        "Message used for out-of-bounds message numbers"
    };

// Start of routine; Default the output messages to "no new message"
    O_ErrorString.NewMessage = false;
    O_ErrorBlip.NewMessage = false;

if (!I_ErrorCode.NewMessage) return; // No change; exit.

// See if the Enable input contains a non zero value.
    // Accommodate Byte or Int32 input.
    if (I_Enable.Value.GetType() == typeof(System.Byte))
        Enabled = ((Byte)I_Enable.Value != 0) ? true : false;
    else // must be Int32
        Enabled = ((Int32)I_Enable.Value != 0) ? true : false;
    if (!Enabled) return;

// Is Enabled.  Convert the ErrorCode message into ErrorString.
        ErrorCode = (Int32)I_ErrorCode.Value;
    if (ErrorCode >= MessageStrings.Length)
        ErrorCode = MessageStrings.Length - 1;

O_ErrorString.Value = MessageStrings[ErrorCode];

O_ErrorString.NewMessage = true;   // Indicate new message
    O_ErrorBlip.NewMessage = true;     // Indicate new message
}
```

FIG. 9. Example mapping of the NCE model (FIG 1) to computer hardware

| 902 | Target computer hardware examples | |
|---|---|---|
| Networkable Computer Entity (NCE) Model Modular Component | 904<br>A Desktop PC with Windows 7 Operating System installed, with an available USB host side connector. | 906<br>An embedded device that is small and lightweight in order to be installed on R/C aircraft and other R/C products. |
| Physical Device | A physical desktop computer (with USB host ports) | An embedded device using an ARM microcontroller based system on a chip. A USB client side connector is required, for communication with a PC. This device contains an audio subsystem, driver circuits for powering LEDs, motors, general purpose I/O etc. |
| Container Operating System | Windows 7 | None (the Kernel serves this function) |
| Visual Part Graph Application Designer Tool | Installed on the desktop to enable development of PGAs, targeting either the embedded device or the PC itself. | Not present because the embedded device hardware and resources cannot support this. Use the PGA Designer in the PC. |
| Networkable Computer Entity | (Container for items below) | (Container for items below) |
| Master Control Program | Runs as a Windows Service written in managed code (such as C#). The PGA Designer Tool uses the Master Control Program Manager as the main conduit for communicating with the embedded device via USB. | Written in the C language. Also serves as the main conduit for communicating with the PC via USB. |
| Part Graph Application(s) | Not applicable in this scenario | The custom application developed by the hobbyist. |
| Native Application(s) | Not applicable in this scenario | Not applicable in this scenario |
| Kernel | A layer underneath the NCE Manager. For this example it is not used to manage PGAs found on the PC, unless the device is being simulated on the PC. | Manages the execution and state of PGAs, and Hardware Layer Drivers. Manages device power up boot process, peripheral interrupt state, hardware timers, and watchdog timer. |
| Hardware Layer Driver(s) | Used by the NCE Manager to gain access to the USB connection to the device. | PGAs and Native Applications call into these modules in order to access the embedded device peripheral hardware (physical) resources. |

FIG. 10A. PGA design example
1001 P51 Model Aircraft Special Effects Generator (machine gun sound and lighting, and engine sound controller)
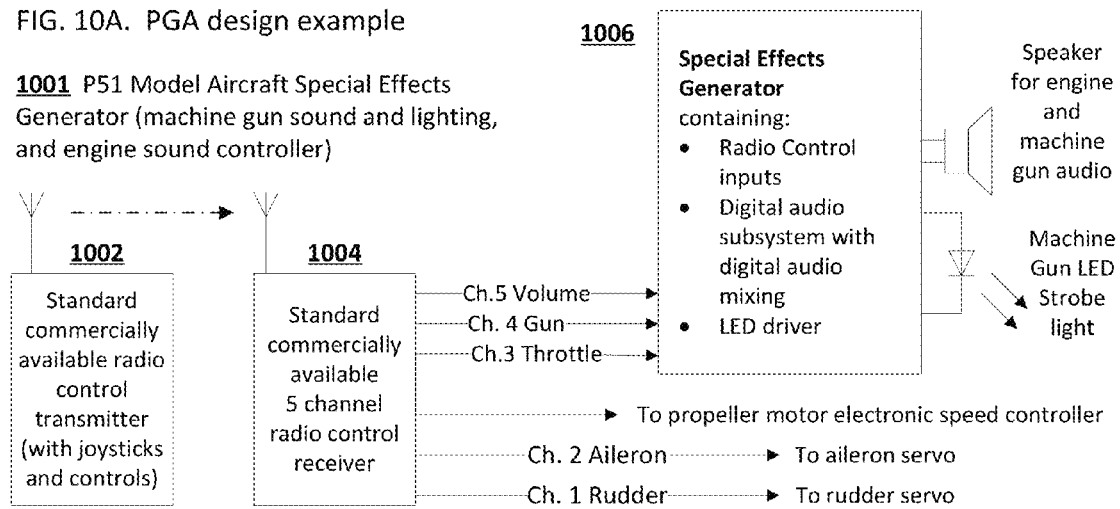
1008 Visual Part Graph Application Designer Tool
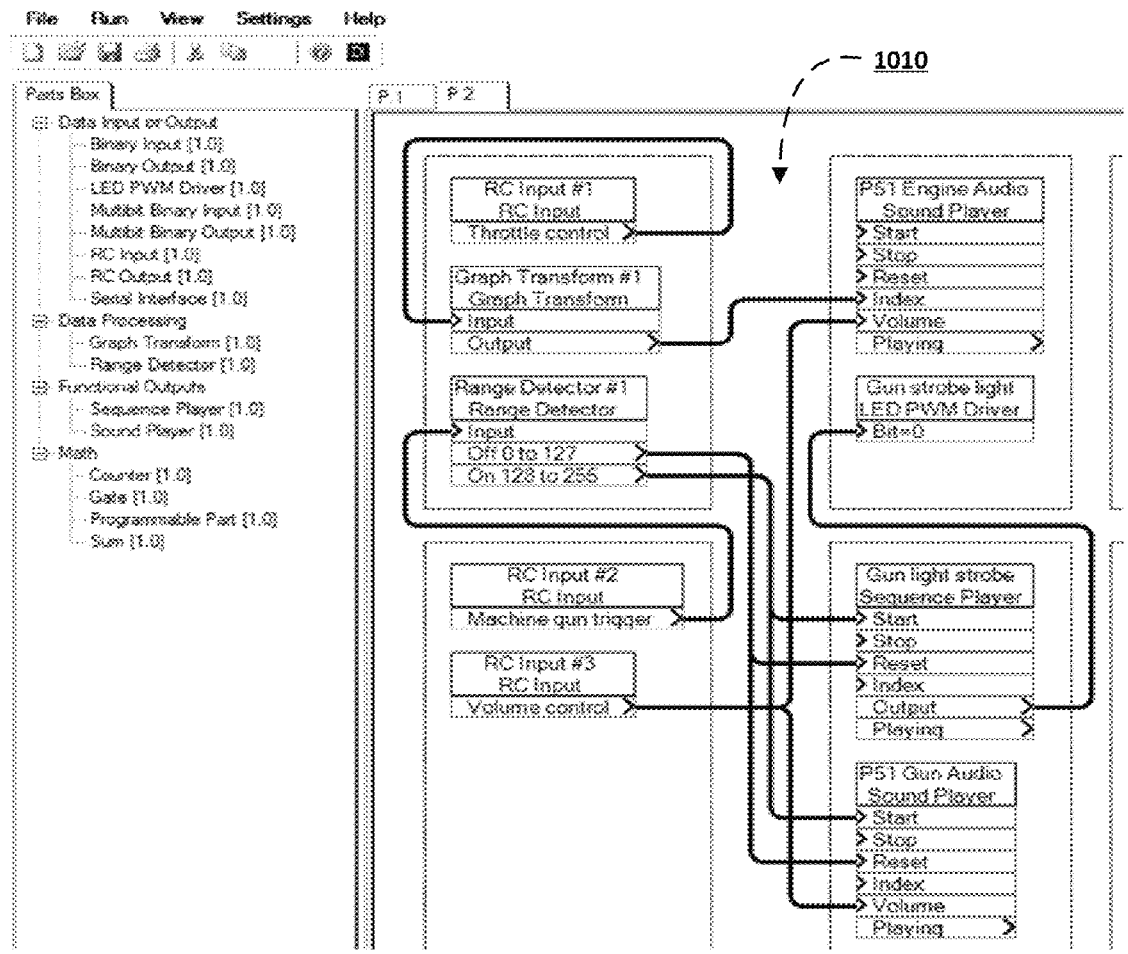

FIG. 10B. PGA design example

1020

RC Input Properties

| Ok | Cancel |

Name: RC Input #1

☐ Debug  ☐ Show "dead signal" indicator

3 ⇅ No. of running samples averaged

0 ⇅ Value used if signal is dead

Output message:

| | Formal Name | Friendly Name | Message Type | ... |
|---|---|---|---|---|
| | IO_PIN_39 | Throttle control | Byte | |

Resource requirements:

| Name | Description | Choice |
|---|---|---|
| R/C input | R/C pulse width modulation input pin | IO_PIN_39 |

1022

Range Detector Properties

| Ok | Cancel |

Name: Range Detector #1

☐ Debug  2 ⇅ Number of numeric ranges to detect

Input message format:

| | Formal Name | Friendly Name | Message Type | ... |
|---|---|---|---|---|
| | Input | | Byte | |

Range detector output(s):

| | Begin | End | Friendly Name | Message type | ... |
|---|---|---|---|---|---|
| | 0 | 127 | Off 0 to 127 | Blip Message | |
| | 128 | 255 | On 128 to 255 | Blip Message | |

1024

Sound Player Properties

| Ok | Cancel |

Name: PS1 Engine Audio

☐ Debug  ☑ Loop  ☐ Retriggerable  ☐ Use loop out

Full audio file path:

\..\AUDIO\PS1_Engine

Additional custom inputs:

0 ⇅

Input messages:

| | Formal Name | Friendly Name | Message Type | ... |
|---|---|---|---|---|
| | Start | | (not wired) | |
| | Stop | | (not wired) | |
| | Reset | | (not wired) | |
| | Index | | Byte | |
| | Volume | | Byte | |

Output messages:

| | Formal Name | Friendly Name | Message Type | ... |
|---|---|---|---|---|
| | Playing | | (not wired) | |

Resource requirements:

| Name | Description | Choice |
|---|---|---|
| Audio channel | Choice of audio channel | Audio_Channel_1 |

1026

Sequence Player Properties

| Ok | Cancel |

Name: Gun light strobe

☐ Debug  ☑ Loop  ☐ Retriggerable  ☐ Use loop out

Full path to sequence file:

C:\SEQ\

Additional custom inputs: 0 ⇅   Time base (milliseconds): 10 ⇅

Input messages:

| | Formal Name | Friendly Name | Message Type | ... |
|---|---|---|---|---|
| | Start | | Blip Message | |
| | Stop | | (not wired) | |
| | Reset | | Blip Message | |
| | Index | | (not wired) | |

Output messages:

| | Formal Name | Friendly Name | Message Type | ... |
|---|---|---|---|---|
| | Output | | Byte | |
| | Playing | | (not wired) | |

FIG 10C.
PGA design example
1028
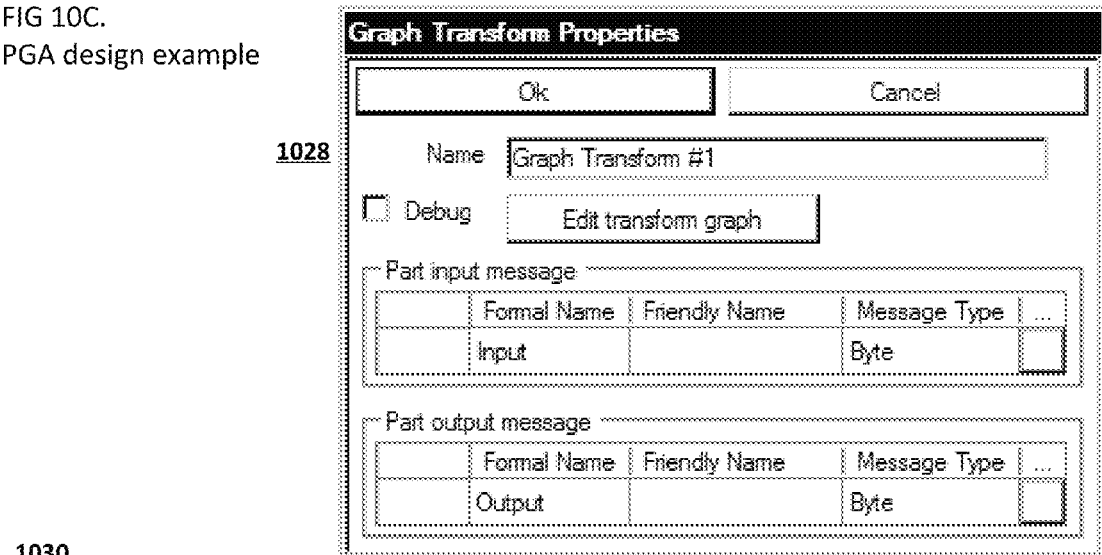
1030
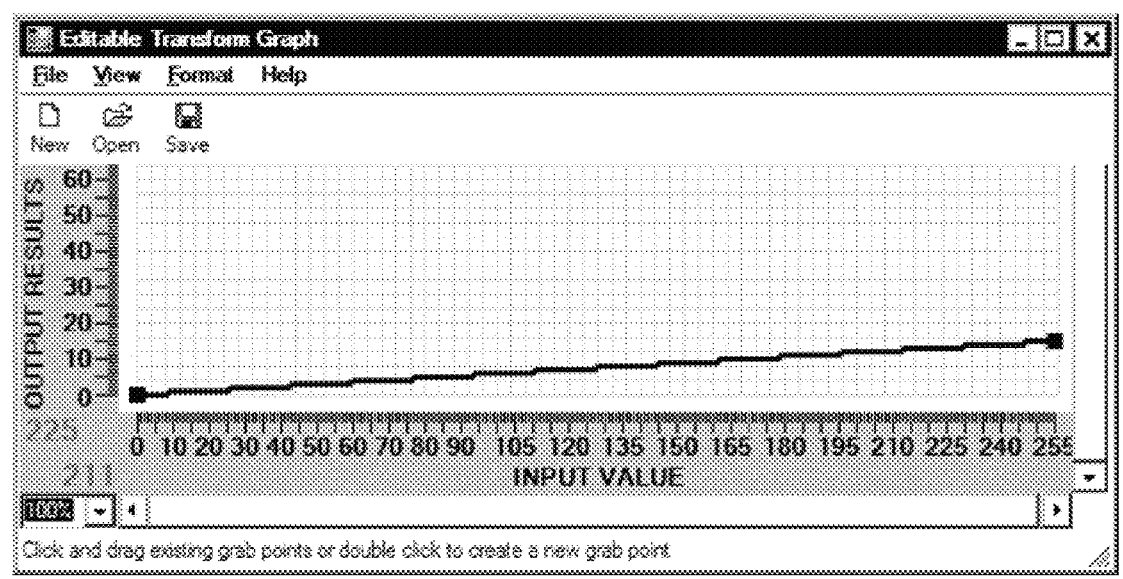
1032
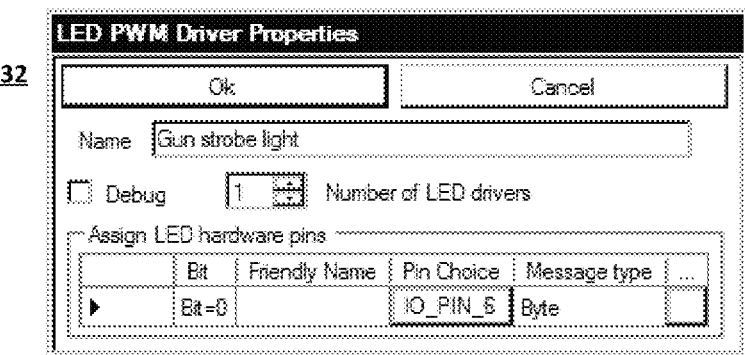

FIG 10D. PGA design example

```
;********************************************************************
; VERBOSE DUMP OF THE PART DATA INSTANCE COLLECTION (PDC) PORTION OF
; A PGA DESIGN, REPRESENTING A NON-MANAGED, CONSTRAINED RESOURCES DESIGN.
; Target processor uses Little Endian data format.
;********************************************************************
; PGA header block follows
0000: 0E00      ; xInitialRamContent = Begin of part initial state data, copied to RAM upon init
0002: 4300      ; xPartInstances    = Begin of part instances
0004: 7102      ; xPartInstancesEnd = End of part instances
0006: 0000      ; xRamStart         = Target RAM start address
0008: 0000      ; (TBD) Initialized Data Compression Mode
000A: 0C00      ; Size of output message memory block
000C: 0900      ; Number of part instances ;********************************************************************
; PGA INITIAL PART STATE DATA (ISD)
; Contains start up output state that is copied from persistent storage to RAM upon reset
; Values in parenthesis () contain the destination RAM address
; This persistent storage data may be compressed.
;********************************************************************
; Per part-instance visible (exposed) output state memory
000E: 0000      ; (0000) out.0 RC Input #1 (RC Input)       : IO_PIN_39
0010: 0000      ; (0002) out.0 Graph Transform #1 (Graph Transform) : Output
0012: 00        ; (0004) out.0 Range Detector #1 (Range Detector)   : 0-127
0013: 00        ; (0005) out.1 Range Detector #1 (Range Detector)   : 128-255
0014: 0000      ; (0006) out.0 Gun light strobe (Sequence Player)   : Output
0016: 0000      ; (0008) out.0 RC Input #2 (RC Input)       : IO_PIN_40
0018: 0000      ; (000A) out.0 RC Input #3 (RC Input)       : IO_PIN_41

; Per part-instance interim (non-exposed) output state memory
001A: 0000      ; (000C) out.0 RC Input #1 (RC Input)       : IO_PIN_39
001C: 0000      ; (000E) out.0 Graph Transform #1 (Graph Transform) : Output
001E: 00        ; (0010) out.0 Range Detector #1 (Range Detector)   : 0-127
001F: 00        ; (0011) out.1 Range Detector #1 (Range Detector)   : 128-255
0020: 0000      ; (0012) out.0 Gun light strobe (Sequence Player)   : Output
0022: 0000      ; (0014) out.0 RC Input #2 (RC Input)       : IO_PIN_40
0024: 0000      ; (0016) out.0 RC Input #3 (RC Input)       : IO_PIN_41

; Per part-instance variables memory

; Gun strobe light : LED PWM Driver
0026: 1C00 0400 ; (0018) C_UninittedScratchMemory.(System.Byte[])
002A:           ; (001C) C_UninittedScratchMemory.(System.Byte[])
002A: 00 00 00 00                                           ; ....

; Graph Transform #1 : Graph Transform
002E: 2400 0400 ; (0020) C_UninittedScratchMemory.(System.Byte[])
0032:           ; (0024) C_UninittedScratchMemory.(System.Byte[])
0032: 00 00 00 00                                           ; ....

; Range Detector #1 : Range Detector
0036: 2C00 0400 ; (0028) C_UninittedScratchMemory.(System.Byte[])
003A:           ; (002C) C_UninittedScratchMemory.(System.Byte[])
003A: 00 00 00 00                                           ; ....

; Gun light strobe : Sequence Player
003E: 00        ; (0030) C_InittedIndexByte.   . (System.Byte)

; P51 Engine Audio : Sound Player
003F: 00        ; (0031) C_InittedIndexByte.   . (System.Byte)
0040: FF        ; (0032) C_InittedVolumeByte.  . (System.Byte)
```

FIG. 10E. PGA design example

```
; P51 Gun Audio : Sound Player
0041: 00           ; (0033) C_InittedIndexByte.  . .(System.Byte)
0042: FF           ; (0034) C_InittedVolumeByte  . .(System.Byte)

;**********************************************************************
; PGA READ-ONLY STATE DATA (RSD)
; Contains read-only data including Part Properties, for each part in the PGA design
;**********************************************************************
; Instance: RC Input #1 : RC Input
0043: 0600        ; PartID       = Part type identifier for: RC Input #1
0045: 0000        ; xOutputs     = Starting RAM offset for outputs of this part instance
0047: 1800        ; xVars        = Starting RAM offset of my scratch variables
0049: 0100        ; LenOutTypes  = Length of output types info
004B: 0000        ; LenInputsInfo= Length of inputs info area
004D: 0100        ; LenResInfo   = Length of resource constants area
004F: 0800        ; LenConstsInfo= Length of constants area
0051: 01          ; out.0 message type=System.Byte
0052: 27          ; Feature=R/C Input, Resource=IO_PIN_39
0053: 00000000    ; C_ConstDefaultValue  . .(System.Int32)
0057: 03000000    ; C_ConstSampleCount.  . .(System.Int32)

; Instance: Gun strobe light : LED PWM Driver
005B: 0F00        ; PartID       = Part type identifier for: Gun strobe light
005D: 0200        ; xOutputs     = Starting RAM offset for outputs of this part instance
005F: 1800        ; xVars        = Starting RAM offset of my scratch variables
0061: 0000        ; LenOutTypes  = Length of output types info
0063: 0300        ; LenInputsInfo= Length of inputs info area
0065: 0100        ; LenResInfo   = Length of resource constants area
0067: 0000        ; LenConstsInfo= Length of constants area
0069: 01          ; in.0 message type=System.Byte
006A: 0600        ; in.0 is wired to out.0 Gun light strobe
006C: 06          ; Feature=Bit=0, Resource=IO_PIN_6

; Instance: Graph Transform #1 : Graph Transform
006D: 0400        ; PartID       = Part type identifier for: Graph Transform #1
006F: 0200        ; xOutputs     = Starting RAM offset for outputs of this part instance
0071: 2000        ; xVars        = Starting RAM offset of my scratch variables
0073: 0100        ; LenOutTypes  = Length of output types info
0075: 0300        ; LenInputsInfo= Length of inputs info area
0077: 0000        ; LenResInfo   = Length of resource constants (there are none)
0079: 0401        ; LenConstsInfo= Length of constants area
007B: 01          ; out.0 message type=System.Byte
007C: 01          ; in.0 message type=System.Byte
007D: 0000        ; in.0 is wired to out.0 RC Input #1
007F: 8300 0001 ; C_ConstTransformTable.  .(System.Byte[])
0083:             ; C_ConstTransformTable.  .(System.Byte[])
0083: 00 00 00 00 00 00 00 00-00 01 01 01 01 01 01 01  ; ................
0093: 01 01 01 01 01 01 01 01-01 01 02 02 02 02 02 02  ; ................
00A3: 02 02 02 02 02 02 02 02-02 02 02 03 03 03 03 03  ; ................
00B3: 03 03 03 03 03 03 03 03-03 03 03 03 04 04 04 04  ; ................
00C3: 04 04 04 04 04 04 04 04-04 04 04 04 05 05 05  ; ................
00D3: 05 05 05 05 05 05 05 05-05 05 05 05 05 06 06  ; ................
00E3: 06 06 06 06 06 06 06 06-06 06 06 06 06 06 07  ; ................
00F3: 07 07 07 07 07 07 07 07-07 07 07 07 07 07 07  ; ................
0103: 08 08 08 08 08 08 08 08-08 08 08 08 08 08 08  ; ................
0113: 08 09 09 09 09 09 09 09-09 09 09 09 09 09 09  ; ................
0123: 09 09 0A 0A 0A 0A 0A 0A-0A 0A 0A 0A 0A 0A 0A  ; ................
0133: 0A 0A 0A 0B 0B 0B 0B 0B-0B 0B 0B 0B 0B 0B 0B  ; ................
0143: 0B 0B 0B 0B 0C 0C 0C 0C-0C 0C 0C 0C 0C 0C 0C  ; ................
0153: 0C 0C 0C 0C 0C 0D 0D 0D-0D 0D 0D 0D 0D 0D 0D  ; ................
0163: 0D 0D 0D 0D 0D 0D 0E 0E-0E 0E 0E 0E 0E 0E 0E  ; ................
0173: 0E 0E 0E 0E 0E 0E 0E 0F-0F 0F 0F 0F 0F 0F 0F  ; ................
```

FIG. 10F. PGA design example

```
; Instance: Range Detector #1 : Range Detector
0183: 0500        ; PartID       = Part type identifier for: Range Detector #1
0185: 0400        ; xOutputs     = Starting RAM offset for outputs of this part instance
0187: 2800        ; xVars        = Starting RAM offset of my scratch variables
0189: 0200        ; LenOutTypes  = Length of output types info
018B: 0300        ; LenInputsInfo= Length of inputs info area
018D: 0000        ; LenResInfo   = Length of resource constants (there are none)
018F: 0800        ; LenConstsInfo= Length of constants area
0191: 0A          ; out.0 message type=Designamo.PartStructs.Blip
0192: 0A          ; out.1 message type=Designamo.PartStructs.Blip
0193: 01          ; in.0 message type=System.Byte
0194: 0800        ; in.0 is wired to out.0 RC Input #2
0196: 9A01 0400   ; C_ConstRangePairsTable  .(System.Byte[])
019A:             ; C_ConstRangePairsTable  .(System.Byte[])
019A: 00 7F 80 FF                                              ; ....

; Instance: Gun light strobe : Sequence Player
019E: 0D00        ; PartID       = Part type identifier for: Gun light strobe
01A0: 0600        ; xOutputs     = Starting RAM offset for outputs of this part instance
01A2: 3000        ; xVars        = Starting RAM offset of my scratch variables
01A4: 0200        ; LenOutTypes  = Length of output types info
01A6: 0800        ; LenInputsInfo= Length of inputs info area
01A8: 0000        ; LenResInfo   = Length of resource constants (there are none)
01AA: 1300        ; LenConstsInfo= Length of constants area
01AC: 01          ; out.0 message type=System.Byte
01AD: 00          ; out.1 is not wired
01AE: 0A          ; in.0 message type=Designamo.PartStructs.Blip
01AF: 0500        ; in.0 is wired to out.1 Range Detector #1
01B1: 00          ; in.1 is not wired
01B2: 0A          ; in.2 message type=Designamo.PartStructs.Blip
01B3: 0400        ; in.2 is wired to out.0 Range Detector #1
01B5: 00          ; in.3 is not wired
01B6: 00          ; C_ConstAdditionalInputsCount.(System.Byte)
01B7: 01          ; C_ConstAutomaticLooping .(System.Boolean)
01B8: 00          ; C_ConstRetriggerable .  .(System.Boolean)
01B9: C201 0700   ; C_ConstSequenceFilePath .(System.String)
01BD: 10270000    ; C_ConstTimeBaseMicrosecs.(System.UInt32)
01C1: 00          ; C_ConstUseLooping .  .  .(System.Boolean)
01C2:             ; C_ConstSequenceFilePath .(System.String)
01C2: 43 3A 5C 53 45 51 5C                        ; C:\SEQ\

; Instance: P51 Engine Audio : Sound Player
01C9: 0E00        ; PartID       = Part type identifier for: P51 Engine Audio
01CB: 0800        ; xOutputs     = Starting RAM offset for outputs of this part instance
01CD: 3100        ; xVars        = Starting RAM offset of my scratch variables
01CF: 0100        ; LenOutTypes  = Length of output types info
01D1: 0900        ; LenInputsInfo= Length of inputs info area
01D3: 0100        ; LenResInfo   = Length of resource constants area
01D5: 1E00        ; LenConstsInfo= Length of constants area
01D7: 00          ; out.0 is not wired
01D8: 00          ; in.0 is not wired
01D9: 00          ; in.1 is not wired
01DA: 00          ; in.2 is not wired
01DB: 01          ; in.3 message type=System.Byte
01DC: 0200        ; in.3 is wired to out.0 Graph Transform #1
01DE: 01          ; in.4 message type=System.Byte
01DF: 0A00        ; in.4 is wired to out.0 RC Input #3
01E1: 83          ; Feature=Audio channel, Resource=Audio_Channel_1
01E2: 00          ; C_ConstAdditionalInputsCount.(System.Byte)
01E3: EA01 1600   ; C_ConstAudioFilePath .  .(System.String)
01E7: 01          ; C_ConstAutomaticLooping .(System.Boolean)
01E8: 00          ; C_ConstRetriggerable .  .(System.Boolean)
01E9: 00          ; C_ConstUseLooping .  .  .(System.Boolean)
01EA:             ; C_ConstAudioFilePath .  .(System.String)
01EA: 2E 2E 5C 2E 2E 5C 41 55 44 49 4F 5C 50 35 31 5F ; ..\..\AUDIO\P51_
01FA: 45 6E 67 69 6E 65                              ; Engine
```

FIG. 10G.  PGA design example

```
; Instance: P51 Gun Audio : Sound Player
0200: 0E00       ; PartID      = Part type identifier for: P51 Gun Audio
0202: 0800       ; xOutputs    = Starting RAM offset for outputs of this part instance
0204: 3300       ; xVars       = Starting RAM offset of my scratch variables
0206: 0100       ; LenOutTypes = Length of output types info
0208: 0B00       ; LenInputsInfo= Length of inputs info area
020A: 0100       ; LenResInfo  = Length of resource constants area
020C: 1400       ; LenConstsInfo= Length of constants area
020E: 00         ; out.0 is not wired
020F: 0A         ; in.0 message type=Designamo.PartStructs.Blip
0210: 0500       ; in.0 is wired to out.1 Range Detector #1
0212: 00         ; in.1 is not wired
0213: 0A         ; in.2 message type=Designamo.PartStructs.Blip
0214: 0400       ; in.2 is wired to out.0 Range Detector #1
0216: 00         ; in.3 is not wired
0217: 01         ; in.4 message type=System.Byte
0218: 0A00       ; in.4 is wired to out.0 RC Input #3
021A: 84         ; Feature=Audio channel, Resource=Audio_Channel_2
021B: 00         ; C_ConstAdditionalInputsCount.(System.Byte)
021C: 2302 0C00  ; C_ConstAudioFilePath .  .(System.String)
0220: 01         ; C_ConstAutomaticLooping .(System.Boolean)
0221: 00         ; C_ConstRetriggerable .  .(System.Boolean)
0222: 00         ; C_ConstUseLooping .  .  .(System.Boolean)
0223:            ; C_ConstAudioFilePath .  .(System.String)
0223: 2E 2E 5C 2E 2E 5C 41 55-44 49 4F 5C          ;..\..\AUDIO\

; Instance: RC Input #2 : RC Input
022F: 0600       ; PartID      = Part type identifier for: RC Input #2
0231: 0800       ; xOutputs    = Starting RAM offset for outputs of this part instance
0233: 3500       ; xVars       = Starting RAM offset of my scratch variables
0235: 0100       ; LenOutTypes = Length of output types info
0237: 0000       ; LenInputsInfo= Length of inputs info area
0239: 0100       ; LenResInfo  = Length of resource constants area
023B: 0800       ; LenConstsInfo= Length of constants area
023D: 01         ; out.0 message type=System.Byte
023E: 28         ; Feature=R/C Input, Resource=IO_PIN_40
023F: 00000000   ; C_ConstDefaultValue  .  .(System.Int32)
0243: 03000000   ; C_ConstSampleCount.  .  .(System.Int32)

; Instance: RC Input #3 : RC Input
0247: 0600       ; PartID      = Part type identifier for: RC Input #3
0249: 0A00       ; xOutputs    = Starting RAM offset for outputs of this part instance
024B: 3500       ; xVars       = Starting RAM offset of my scratch variables
024D: 0100       ; LenOutTypes = Length of output types info
024F: 0000       ; LenInputsInfo= Length of inputs info area
0251: 0100       ; LenResInfo  = Length of resource constants area
0253: 0800       ; LenConstsInfo= Length of constants area
0255: 01         ; out.0 message type=System.Byte
0256: 29         ; Feature=R/C Input, Resource=IO_PIN_41
0257: 00000000   ; C_ConstDefaultValue  .  .(System.Int32)
025B: 03000000   ; C_ConstSampleCount.  .  .(System.Int32)

;*****************************************************************
; END OF FILE
;*****************************************************************
; FlashDesignLength = 0x25f;
```

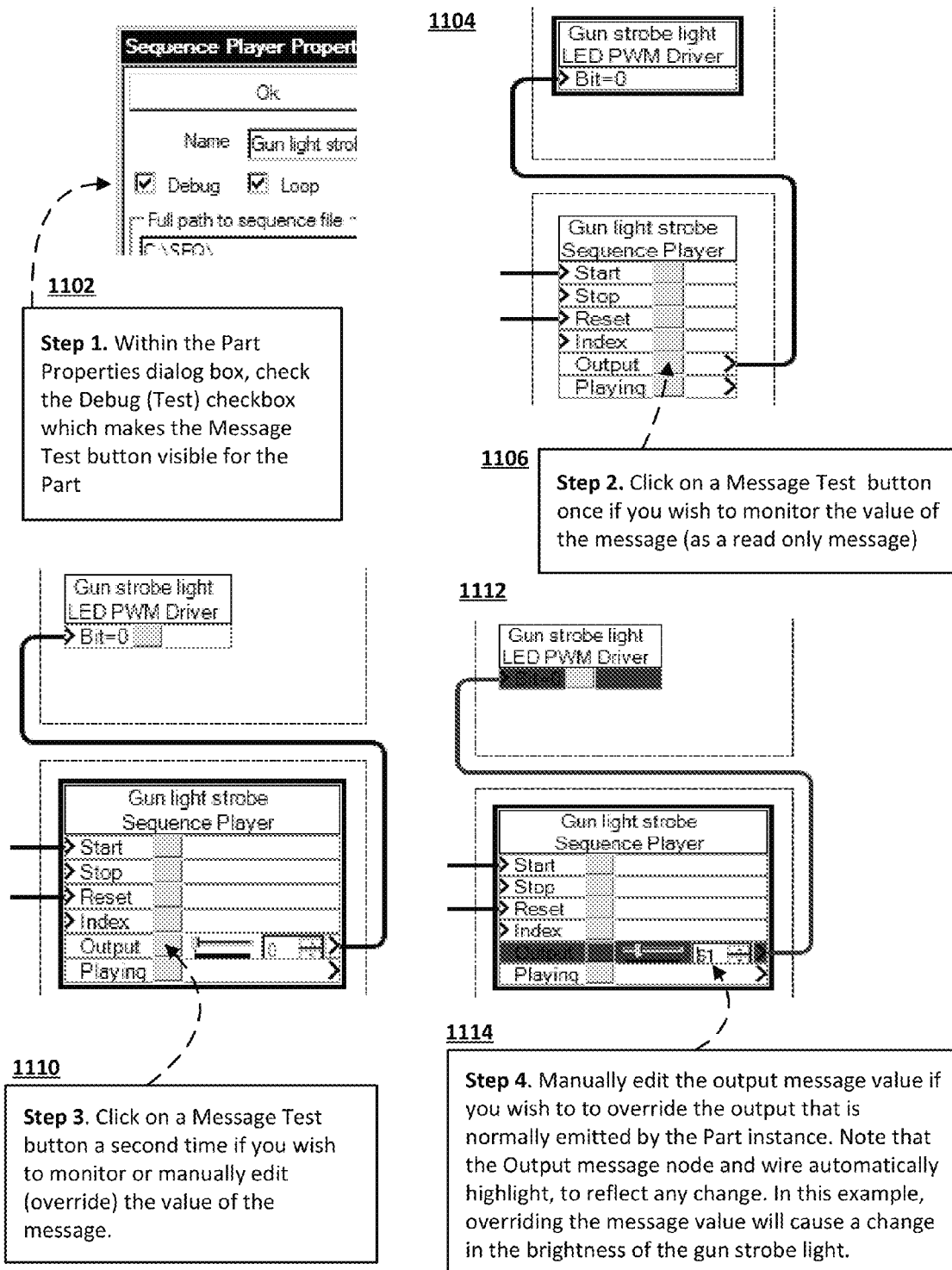
FIG. 11A. Inspecting and modifying PGA messages via PGA Tester

FIG. 11B. PGA Tester controls
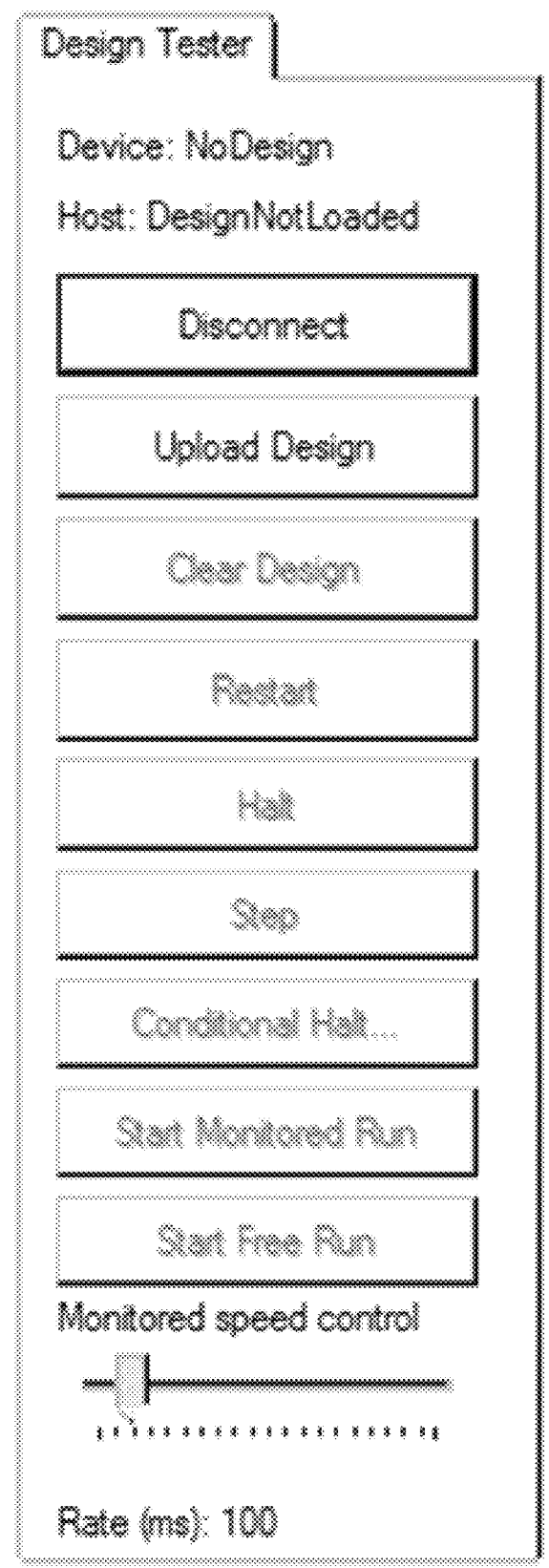

SYSTEM AND METHODS FOR END-USERS TO GRAPHICALLY PROGRAM AND MANAGE COMPUTERS AND DEVICES

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not applicable

BACKGROUND OF THE INVENTION

1. Field of the Invention

This invention relates to a means of programming computers and devices that contain embedded computers, using visual programming language (VPL).

2. Description of the Related Art

The following is a tabulation of some prior art that presently appears relevant:

| Pat. No. | Kind Code | Issue Date | Patentee |
|---|---|---|---|
| 5,850,548 | B1 | Dec. 15, 1998 | Williams |
| 6,683,624 | B1 | Jan. 27, 2004 | Pazel et al. |
| 7,047,518 | B1 | May 16, 2006 | Little et al. |
| 7,290,244 | B1 | Oct. 30, 2007 | Peck et al. |
| 7,949,995 | B1 | May 24, 2011 | Sadlek |
| 8,074,203 | B1 | Dec. 6, 2011 | Dye et al. |
| 8,291,408 | B1 | Oct. 16, 2012 | Czymontek |

VPLs described in prior art relate to audiences who already have some skill in traditional textual-based computer programming. This invention is unique in that the user of the VPL does not require programming skill.

With this invention, end-users develop their own application programs for computers and computing devices using a visual, graphic programming technique involving Parts and Wires. The Parts represent software modules that are developed and fully tested and certified by Original Equipment Manufacturers (OEMs) or Independent Software Vendors (ISVs). End-users can modify exposed properties of a Part, but they do not have access to the programming logic within. An optional Programmable Part may be exposed by the OEM/ISV if the anticipated user audience includes programmers.

Various prior art describes application of VPLs to one specific scenario. Examples of specific scenarios are web apps, test instrumentation, digital signal processing, and data streaming. This invention is a system for using a VPL to program any computer or computing device for many purposes. A major advantage of this invention is that it enables non-programmer end-users to program broad categories of end-user products such as everyday consumer appliances and toys. This invention would serve well as a model for an industry standard.

In a common scenario, OEMs design and test the Parts for the end-user to fulfill the needs of a particular product. The end-user does not need to know how to program. Instead, the end-user simply needs to connect the graphical parts with graphical wires and optionally fine tune the behavior of the parts by editing Part properties.

The Parts are pre-compiled by the OEM into object code. The part object code is combined with the target device kernel to create a working application.

Users fine tune the behavior of a part instance by editing its properties page. That page is also developed and fine-tuned by the OEM.

VPLs present a data synchronization challenge that prior art does not address in a simple and intuitive way for non-programmers. Considered from a dataflow perspective, a VPL design can contain multiple parallel data paths and looping data paths. This invention incorporates a double buffering of the data output messages in each Part. Double buffering enforces a deterministic "lock step" message passing behavior. For example, if a new message appears at the Input Terminal of the first Part Instance in a sequential chain of three parts (a serial pipeline), three distinct "system clocks" occur before possible changes may appear at the Output Terminal of the last Part Instance in the daisy chain. This pipeline behavior is relatively easy for end-users to visualize, as the timing of the message passing is clear and deterministic.

Double buffering also simplifies the issue of optimizing the use multiple central processing unit (CPU) cores in order to implement parallel processing. No part has a dependency upon execution order of any other part. Each part may be assigned to an arbitrary CPU, and may be executed in parallel with other parts.

BRIEF SUMMARY OF THE INVENTION

A computer or computing device that has a means of connecting to others is a Networkable Computer Entity (NCE). This invention relates to a system that enables consumers (end-users) who are not skilled in traditional computer programming, to nevertheless program, manage, and configure Networkable Computer Entities (NCEs), and enable NCEs to communicate with each other. For example, the end-user can use their personal computer as a tool for configuring programming and interconnecting devices, toys, home appliances, robotic devices, and the personal computer itself.

Technically, there is no definite geographic distance limit between intercommunicating NCEs.

An NCE may be any computer-based product or computer, virtualization or simulation.

A small electronic product that contains a computer may be referred to as a device. The device may use a reduced functionality operating system as compared to a traditional PC, and its capabilities may be more specialized and limited.

Consider the end-user, who may own a PC, smartphone and one or more devices. Historically the connectivity relationship between these products has been limited. Since devices commonly serve one specific function and cannot be reconfigured or reprogrammed by the average end-user, this limits the functional utility and end-user value of the device. Many devices do not or cannot communicate with the PC or the internet "cloud" (wired or wirelessly). This isolation limits device utility. There is no consistently used communication protocol or messaging system that enables computerized products, such as personal computers and devices, to communicate with each other as peers. To use the Tower of Babel metaphor, they all speak different languages.

Those few appliances, devices etc. that do communicate with the PC often use a unique, custom proprietary protocol, communicating with a custom application running on the PC.

Further, the end-user can usually only configure existing program settings and cannot change the program flow or create a new program. An example is a wireless router that is configurable via a web page, allowing the end-user to configure its settings; but the end-user cannot reprogram its core functional behavior.

Many devices are very limited in internal resources and performance, and they are commonly pre-programmed when manufactured to perform a single very specific task, as defined by an internal dedicated computer application. Devices are often not configurable, or have limited configuration choices. Examples include but are not limited to the electronic greeting card, powered toothbrush, digital thermometer, home cellar flooding sensor, USB storage stick, and an electric motor and special effects microcontroller for radio-controlled models.

More advanced devices offer additional configurability but typically do not allow the end-user, with limited or no programming skills, to program them without needing to learn a programming language, such as a home weather station, synthesized musical instrument, home automation and management systems, robots, computer controlled plotters, and other products that typically require true real-time (timing-critical) performance, and animatronics and assorted entertainment appliances such as special effects generators.

This invention includes an architectural model that enables end-users to develop their own application programs for NCE products using a visual, graphic programming technique involving Parts and Wires. Such Applications are henceforth named Part Graph Applications (PGAs).

Here is an example scenario that outlines the steps followed by the end-user to create, design and deploy a consumer-designed application (PGA) to a small device using a PC. Both the PC and the device are NCEs.
1. Connect the device to the PC, via wired (such as USB cable or Ethernet) or wireless (such as Bluetooth) connection.
2. On the PC, run an application used to develop PGAs (PGA Designer). PGA Designer presents the end-user with a visually presented collection of Parts that were developed by the Original Equipment Manufacturer (OEM) in order to accommodate the specific targeted NCE feature functionality. On the PC display, the end-user will choose from the offered collection of visual Parts, dragging chosen Parts onto a visual workspace.
3. Connect these Parts together by using the mouse to drag Wires between the chosen Parts.
4. Double click on each Part (or for a touch screen, use touch and hold), which brings up a Property Page for each Part, to enable the user to fine tune the properties, behavior, features and other characteristics of the Part.
5. Use the visual user interface to interactively test and adjust the completed PGA design by single stepping through its operation, etc.
6. Instruct PGA Designer to transfer the finished PGA design to the target NCE device.
7. If the device is designed to run disconnected from the PC (i.e. operate independently), the end-user may now disconnect the device from the PC.

This invention offers benefits to the end-user or technician, providing:
1. A simple, common, consistent visual programming language approach; once the end-user learns how to develop a PGA using the visual programming interface, the end-user will know the basic concepts for programming any other computer (large or small).
2. The ability to richly program, configure and adjust the PGA, without needing advanced computer programming experience or training.
3. The ability to fully leverage the power of the PC in order to manage and interface with many diverse types of devices and other computers.
4. Enhanced device versatility and value, breaking the tradition of being programmed one time only at the factory.
5. Fulfillment of "ubiquitous computing", i.e. the vision of small, inexpensive, robust networked processing devices, distributed at all scales throughout everyday life. Extend the cloud networking model to fully embrace many diverse types of NCEs.
6. Measurement and tuning of real-time device performance.
7. A standardized application programming interface. For more advanced system developers who use languages such as C#, this invention enables easy communications with NCEs using a Master Control Program Application Programmer Interface (API).

This invention offers benefits to the developer/designer, such as the Original Equipment Manufacturer (OEM) of the product, providing:
1. Complete control over the choice of features and functionality presented to the end-users via the PGA Designer. As a consequence, the software object code modules that constitute Parts are fully pretested and precompiled by the OEM. This insulates the end-user and technician from source code and reduces the need to test. With full control over the source code, the OEM has complete control of the reliability, consistency and performance of each Part, and by extension, the NCE as a whole.
2. A common, stable, consistent, scalable, extensible PGA industry standard which, once adopted, will make it easier to find a broader selection of computer developers who are experienced with the standard. The OEM needs only to learn and train for a single development model that will be useful for all future NCE designs, for very large as well as very tiny implementations.
3. A consistent development platform. The OEM can leverage what they have learned developing the current NCE, towards development of future, more diverse varieties and types of NCEs.
4. A universal, extensible, communication specification between many computer-based products, accommodating very inexpensive devices that contain extremely limited computing resources.
5. The ability to design and develop visual Parts using testing, simulation and debugging technologies on a more advanced computer such as the desktop PC, and then being able to port and recompile the developed and tested Part software to the intended target NCE platform.
6. The option to offer free demonstration software which simulates the physical NCE in a desktop PC. For example, the user can install and preview a simulated NCE on their PC, and then decide whether to purchase the real NCE.
7. A means of accommodating and fully leveraging the power of parallel computing when a NCE contains more than one processor core.
8. A means of managing NCE power management, such as sleep and standby modes, for saving energy and extending battery life.

BRIEF DESCRIPTION OF THE SEVERAL
VIEWS OF THE DRAWING

FIG. 4 is a State Diagram for a Master Control Program.

FIG. 5 is a flowchart describing how the Master Control Program interprets part instances within a Part Graph Application (PGA).

FIG. 6 is a visual example of PGA Physical Resources Management.

FIG. 7A is an example Property Page reporting a resource conflict between Parts.

FIG. 7B is an example Physical Setup Requirements report for an NCE.

FIG. 8A is a graphical view of one implementation of a Programmable Part and its Property Pages.

FIG. 8B is an example of a program script for a Programmable Part.

FIG. 9 is a table listing two target computer examples and their relationship with the NCE architectural model FIGS. 10A through 10G outline a PGA design example.

FIGS. 11A and 11B describe the testing and debugging process, and one embodiment of a visual testing interface.

DETAILED DESCRIPTION OF THE INVENTION

Figure 1:
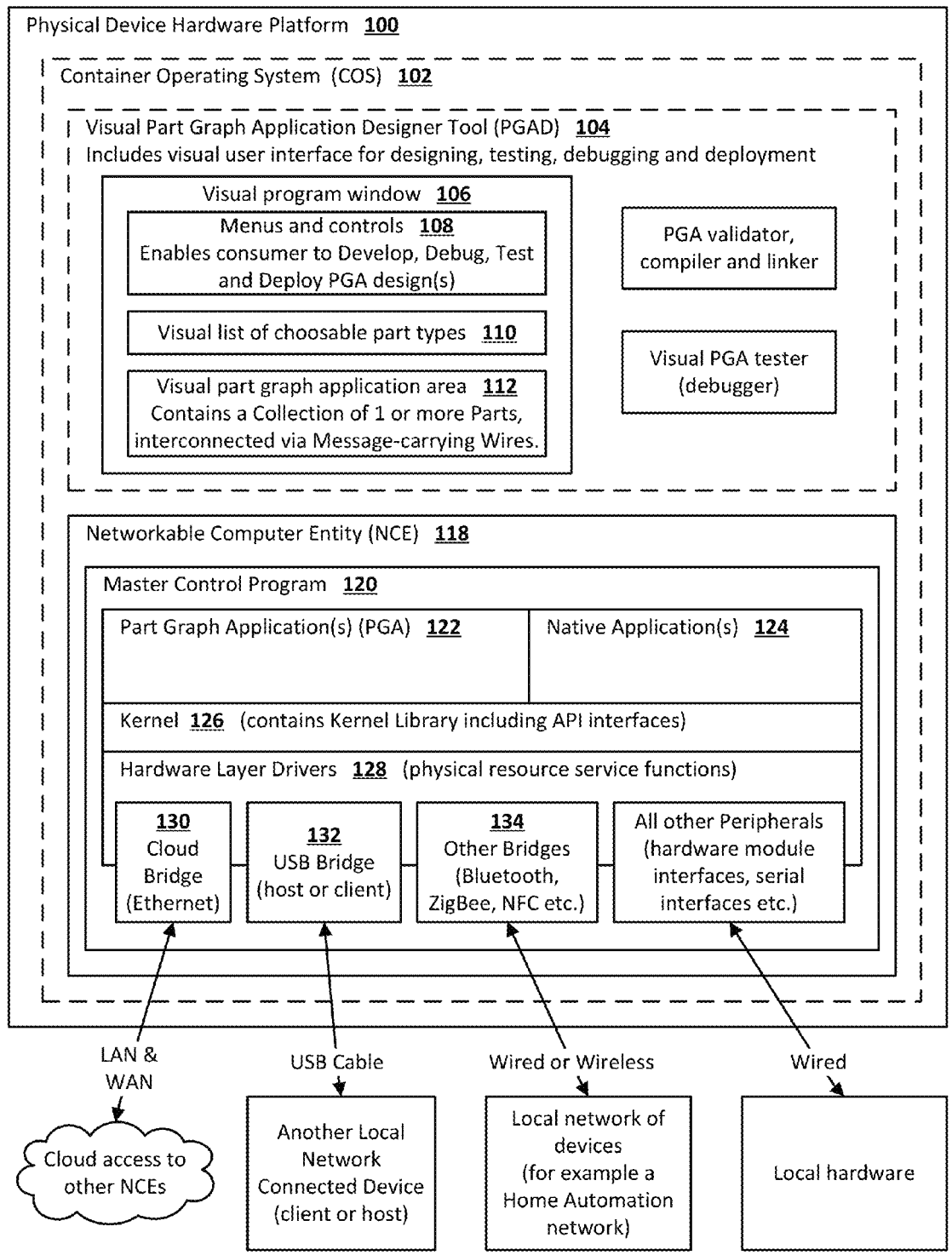
FIG. 1 is an overview block diagram of the Networkable Computer Entity (NCE) Model.

FIG. 1 is a diagram of the Networkable Computer Entity Model.

This invention offers a flexible architectural model that is deployed within computers and computing devices, to allow diverse computers and computing devices, generically referenced as Networkable Computer Entities (NCEs) 118, to freely communicate with one another, and to allow a computer to host a Visual Part Graph Application Designer Tool (PGAD) 104 whose purpose is to enable end-users to visually configure and program the NCE 118 by developing one or more Part Graph Applications (PGAs) 122 that execute in NCEs.

Professional systems designers and Original Equipment Manufacturers (OEMs) may design custom implementations of the PGAD 104 in order to accommodate their specific target computers and computer-based devices and their intended usage role(s). For example, the PGAD 104 can be crafted to enable end-users to develop a PGA 122 for delivery to, and execution within a powerful personal computer. At the opposite extreme, a PGAD may be crafted that targets PGA development for a small, simple, inexpensive embedded device.

PGAD 104 is an application that typically runs in a computer that contains a visual program window 106 and a human input interface with menus and controls 108, a visual list of choosable part types 110 and a visual part graph application area 112. The end-user can pick and choose Parts, interconnect the Parts with Wires, and set Part properties using a visual user interface, keyboard and mouse and/or touch input.

PGAD 104 is represented in FIG. 1 as a dashed box because it is optional and used in a physical hardware platform that is capable of supporting it.

The Physical Device Hardware Platform 100 is the computer or computing device hardware. This may refer to, but is by no means limited to, the following types of products:
1. Desktop PC (containing one or many CPU cores)
2. Small embedded device (ARM, PIC, 8051 Microcontrollers etc.)
3. Thin client computer
4. Personal smartphone
5. Personal MP3 player
6. Personal electronic devices, cameras etc.
7. Avionic electronics within a model aircraft or an unmanned aerial vehicle (UAV)
8. Desktop PC simulating any of the above Physical devices may connect to each other via a wired or wireless link such as Ethernet 130; in which case communications may travel through, but is not limited to, any of the following network entities, mechanisms or arrangements: proxy, gateway, bridge, router, switch, network hub repeater, and wireless access point.

Other examples of communication links include USB 132, Bluetooth, ZigBee and Near Field Communication (NFC) 134. For USB, one physical device (NCE) contains the "host USB controller", and the other physical device (NCE) contains the "client USB controller".

The Container Operating System (COS) 102, whether real or virtualized, resides in the physical device hardware platform and hosts the NCE. The COS may host more than one NCE. The use of a COS in a physical device is optional; for example, very small microcontroller-based devices can be configured without one, in which case the NCE's Master Control Program itself is the effective operating system. The COS may be any operating system, including but not limited to personal computer operating systems such as Microsoft Windows, Apple OS X and Linux, or embedded operating systems such as Windows CE, FreeBSD, VxWorks, and Embedded Linux.

The Visual Part Graph Application Designer Tool (PGAD) 104 is itself an application (or collection of applications), used by the end-user, to develop applications (PGAs) for an NCE 118. PGAD itself is custom tailored by a professional software developer, to specifically accommodate a particular NCE product and its intended usage scenarios. The professional software developer may collaborate with an OEM who designed a specific targeted Physical Device Hardware Platform. A company that makes software development tools may provide a general PGAD Software Development Kit (PGAD SDK) targeting the OEMs and developers in order to facilitate development of their specific, custom PGA Designer application.

PGAD typically is developed for operation within a PC, smartphone or other tool hosting device that meets minimum requirements. For example, the PGA Designer's host computer needs to contain human interface hardware, memory resources, and a communication interface to the target NCE(s) that the PGA Designer will be programming.

The PGAD feature set may include:
1. A visual user interface that the end-user uses to drag and drop functional modules called Parts, into a visual design area.
2. The ability to establish connections between Parts in the application, called Wires. Wires enable transferring of messages between Parts.
3. The ability to custom-tailor the Properties (settings) of each Part.
4. Compiling the completed design.
5. A means of transmitting the completed PGA to the target NCE.
6. A means of enabling the end-user to test, step through, and debug the PGA, as it is running in the target NCE.
7. A means of simulating a target NCE. A simulation is a computer application that replaces the physical target NCE by replicating its functionality using virtualization. The simulation can be used to test a PGA design in a virtual NCE before testing it in a physical NCE.
8. A library of saved PGAs that can be deployed when and as desired, to local and remote NCEs.

9. A means of managing, tracking and controlling NCEs in their personal network domain, be it local, remote, or both.
10. The means for the end-user to search for review and receive PGAs developed by other end-users or developers.

A Networkable Computer Entity (NCE) 118 presents itself as a discoverable entity in the network cloud. A single physical computing device or computer may manifest itself as more than one entity in the network cloud. The NCE is based on a lowest-common-denominator baseline specification that can accommodate the limited features and capabilities of extremely simple devices. The baseline can then be extended with higher layer features in order to leverage rich and more extended and/or extensible features and capabilities of higher performance computers.

Higher performance devices such as personal computers and servers commonly use state of the art managed code (CIL-based) programming development tools (e.g. .NET Framework, C#, XAML, WPF, Silverlight, HTML5 etc.). If the target NCE accommodates managed code, there is a strong incentive to develop the NCE using managed code (such as C#). On the other hand, the simplest, least expensive computing devices may not have the resources or performance needed for managed code. For such devices the end-user may use non-managed programming languages (such as C++, C, or even native processor assembly language).

A NCE can be simulated. Here are a few scenarios.
1. Simulation may be used, in a PC for example, to demonstrate or evaluate a NCE. This can be useful for offering a free demonstration of a target device, so an end-user can evaluate whether or not to purchase the real NCE.
2. Consider a NCE such as a networked home weather station hardware module that uses an embedded microcontroller using C as its native programming environment. The hardware module may be completely simulated in software in a desktop PC. In this scenario, the OEM designer can develop, test and debug C part modules using the Windows Win32 programming environment. After testing, the finished code can be ported to a build environment for the target NCE's embedded device compiler, in order to compile the C source code for the target NCE microcontroller.

Here are a few architectural considerations when designing a system of intercommunicating NCEs that can fully leverage this invention. The architecture should be:
1. Computer agnostic. The architecture is not limited to any particular computer processor, manufacturer, or type, in order to be extensible across different platforms.
2. Operating system and language agnostic. The architecture is not limited to any specific operating system or language, and accommodates managed code and/or native code, in order to be extensible across different OS technologies and languages.
3. Functionally scalable. New functional features may be added or removed as needed with minimal effort. This enables its use in many computing devices, from a high performance computer, to extremely simple devices, such as a programmable greeting card.
4. Load scalable. Computers can be added or removed to accommodate a change in load demand.
5. Geographically scalable. Performance, usefulness, and/or usability are retained regardless of expansion from concentration in a local area to a more geographic pattern.
6. Administratively scalable. A few or very many organizations easily share a single distributed system.
7. Extensible. Accommodates future growth, providing for change while minimizing impact to existing system functions.
8. Forward compatible. Compatible with older software versions, albeit with capability or functionality that may be reduced or limited to the feature set of the older software.

The Master Control Program 120 represents the software engine of the NCE.

FIG. 4 represents a possible manifestation of a Master Control Program state machine. Beginning at the NoPower/Unlaunched 402 state, a power on reset event results in Self-Test 406 execution. Upon successful self-test, the Master Control Program determines if there is a PGA resident and marked to automatically execute. If one is available, the PGA is initialized in the InitializingPga 414 state. Once the PGA completes initialization, the next state is either RunningPga 418 or TestingPga 420 depending on whether an external or internal condition indicates that the NCE is in a testing state.

If a PGA is not ready to execute at FindingPga 410, the next state is NoPga 412 where the NCE waits until a PGA is received from an internal or external source.

NCE features and capabilities are scalable. A NCE can expose very simple functionality to other NCEs (for example it can be simply a digital home thermometer) or it can expose very sophisticated functionality (for example it can be a Windows Service application, functioning as a "librarian" service agent on the web that manages and exposes collections of NCE information to other NCEs).

For a diverse community of NCEs to communicate with each other, all NCEs use a common protocol, i.e. "speak the same language" and this relationship remains true as new functionality is developed. Formation of a central feature functionality clearing house would be beneficial. For convenience, call it the "Networkable Computer Standards Organization" (NCSO). NCSO could manage feature functionality that is common to all Networkable Computers, as well as managing custom feature functionality that is unique to a class of Networkable Computers (and this functionality can optionally be secured and private to a specific group).

The lowest network messaging layer of the NCE is that which accommodates a command message sent to another NCE, and a corresponding response message sent back (with no guarantee of a returned response, i.e. a "connectionless" service). A NCE sends a message to exactly one receiver NCE, who may reply with a response message.

Higher layer messaging protocols are structured and designed in accordance with the particular needs of each corresponding feature or function. For example, a feature that requires two or more state-sensitive transactions likely requires that a "session" is first established between two NCEs, in order to use a connection ID to manage the session, for the life of the session.

A NCE may deploy Fault Tolerance, including but not limited to the following features:
1. A watchdog timer.
2. Hardware redundancy.
3. Minimization of device complexity (such as minimizing chip count) to reduce probability of failure.
4. Multiple device voting & device vetoing.
5. Architecting a NCE or a networked collection of NCEs with a goal of minimizing or eliminating single points of failure (vulnerabilities).
6. Alternate means of bootstrapping, overriding or replacing NCE or PGA code.
7. Recovery in the case where installing or updating a newer NCE or PGA image crashes.
8. A means of automatically or manually reverting to a last known good NCE OS image or PGA application.
9. Automatically recovering from an interrupted transfer (LAN, WAN, USB, wireless, etc.)

A NCE may contain multiple processors and establish multiple topology relationships between the processors.

Examples of types of services, features or functions are represented below. This is not intended to be a complete list.

1. DEPLOYMENT (OF A PGA, WHOLE NCE IMAGE OR BOOTSTRAP IMAGE)
   1.1 Transmit (push) a PGA. Option to execute or reboot target. Option to retain more than one PGA in self. Option to receive into different media (RAM, flash, other storage).
   1.2 Transmit (push) a NCE image. Option to execute or reboot target. Option to retain more than one application in self. Option to receive into different media (RAM, flash, other storage).
   1.3 Transmit (push) prerequisite required (common library) files to accommodate an application.
   1.4 Transmit (push) Physical setup requirements of a remote NCE.
   1.5 Transmit (push) a request to a target NCE to execute or reboot an application.
   1.6 Receive (pull) an application (PGA or Native Application). Option to self-execute or reboot. Option to retain more than one application in self. Option to receive into different media (RAM, flash, other storage).
   1.7 Receive (pull) a NCE image. Option to self-execute or reboot. Option to retain more than one application in self. Option to receive into different media (RAM, flash, other storage).
   1.8 Receive (pull) prerequisite required (common library) files to accommodate an application (PGA or Native Application).
   1.9 Receive (pull) Physical setup requirements of a remote NCE.

For devices using write wear limited persistent storage, the NCE OS and the library may be placed at the beginning of the download module and the PGA application is located at the end, to minimize bit rewriting, when re-flashing. Also an NCE or PGA image may be deployed to volatile memory (e.g. RAM) or non-volatile memory (e.g. flash memory).

2. REPORTING OF CAPABILITIES
   Transmission (pushing) to another NCE, or requesting and receiving (pulling) the following information from another NCE:
   2.1 Physical setup requirements.
   2.2 NCE capabilities (such as OS version, boot code version, list of installed services, Library Parts and/or DLLs).
   2.3 PGA identity (unique GUID identifier(s) of installed PGA(s), and identification of which PGA instance is currently the default boot instance).
   2.4 NCE Identity (such as unique GUID, Version, serial number).
   2.5 NCE metrics (such as total RAM, total Flash, Hardware model and version, MCU chip information, CPU speed, RAM and Flash read/write speed, flash programming block size, address of boot block, address of OS, address of PGA(s), inventory list of on-board chips etc.).
   2.6 Performance metrics (such as estimated worst case system latency, option to dynamically monitor any desired timing metric, for example specifying a timer start trigger event such as a part output change, and a corresponding event that stops the timer, Parts enumeration loop time (instantaneous and average), etc.).
   2.7 NCE Physical Setup Requirements.
   2.8 NCE Operational Notes (such as human readable notes regarding the currently installed PGA).
   2.9 Loaded PGA metrics (for example, total RAM used, total Flash used, resources used).
   2.10 Device capabilities and details. Includes a list of service capabilities, and sub functions within services etc. Includes Reporting OS version compatibility including identification of backwards compatible versions.
   2.11 Application (PGA and Native Application) statistics logs (such as usage, exceptions, performance, etc.).
   2.12 PGA design prerequisite requirements.
   2.13 All communication bridge interfaces and their status.
   2.14 PGA library manager capabilities (function as a cloud service that manages a collection of NCEs to enable trusted communications between NCEs).
   2.15 Service capabilities (this is a list of all services offered by the NCE).
   2.16 Device identity (NCE hardware design ID & version, host OS info (if any), NCE hardware serial number, NCE manager ID & version, PGA IDs & versions).
   2.17 Device capabilities reported via WMI, if the NCE is hosted (nested) inside a Windows OS for example.
   2.18 Performance statistics such as Flash memory write wear statistics etc.

3. SECURITY MANAGEMENT
   3.1 Creating and managing a secure session between two NCEs; consider using claims-based identity.
   3.2 Implementing NCE and PGA protected privileges to prevent unauthorized usage.
   3.3 Receive (pull) request for detection and acceptance of trusted sender (before receiving).
   3.4 Transmit (push) request for detection and acceptance of trusted recipient (before sending).

4. CLOUD MANAGEMENT
   4.1 Search and Find a PGA or NCE image (discovery).
   4.2 Search and Find updates or images.
   4.3 Publish a PGA to a WAN or LAN server.
   4.4 Caching PGAs and images in client (service) terminals for local redistribution if targeting greater than one local target.
   4.5 Caching PGAs and images in server terminals.
   4.6 Immediately before the PGA starts, option to search the cloud for the latest software version of the PGA.

5. DIAGNOSTICS AND DEVICE STATISTICS
   5.1 Launching diagnostics (self-test) PGAs and managing the collection of self-test PGAs' progress and results.
   5.2 On-line NCE tracking history; keeping track of NCEs that have been on-line in the past; for example to report NCEs that are currently not visible "in the cloud". They may not be attached because the normal usage scenario of a device is to not be attached, such as a logger, personal device etc.
   5.3 Collection and maintenance of device performance statistics.
   5.4 Collection and maintenance of device flash memory writing statistics (write wear leveling etc.).
   5.5 Windows Management Instrumentation (WMI) equivalent functionality.
   5.6 Core dump/Crash dump capability.
   5.7 PGA event logging.

6. APPLICATION DEVELOPMENT AND TESTING
   6.1 Execute a PGA on the target while connected to PGA Designer.
   6.2 Test and debug a PGA (on target or simulated target) while connected to PGA Designer.
   6.3 (OEM) Ability to design parts via the software tool in order to support design development for the end-user.
   6.4 Report whether the NCE or PGA(s) are debug builds and whether they are released.

7. SENDING PART MESSAGES BETWEEN NCES
   7.1 Using a Cloud Resource Part to send a message to a part located in a different PGA Instance.

7.2 Using a Cloud Resource Part to receive a message from a part located in a different PGA Instance.
8. EXAMPLES OF OTHER INDUSTRY STANDARD MESSAGING PROTOCOLS
8.1 Web Services on Devices
8.2 Devices Profile for Web Services
8.3 Digital Living Network Alliance
8.4 Universal Plug and Play Referencing FIG. 1, a Part Graph Application (PGA) 122 is an application typically developed by the end-user using the PGA Designer and executes within the NCE.

1. A PGA appears visually to the end-user as a collection of graphically represented object instances and graphically represented Wires 112 that are used to connect the chosen collection of Part(s).
2. Referencing FIG. 3, a Part Type 302 is a software module that is a unit of functionality that represented visually to the end-user.
3. When an end-user chooses a Part Type 302 and adds it to a PGA, a Part Instance 324 is added to the PGA. Multiple instances of the same Part Type may be represented in a PGA, if the Part Type behavior allows.
4. The end-user may visually edit the Properties (FIG. 10B) of each Part Instance 324, custom tailoring it to fulfill their specific PGA goals.
5. Referencing FIG. 2, a visual part instance 280 may contain visual input terminal instances 282 ("inputs") and visual output terminal instances 284 ("outputs"). The end-user may connect visual part instances together using a visual wire 297, one end attached to an output and the remaining end attached to an input.
6. Conceptually the end user can visualize a packet of data propagating from an output to an input, via a visual wire. The packet contains a data payload called a Message. An output may connect to one or more inputs, but connecting two or more outputs together is normally disallowed. The visual wire logically indicates an input is referencing a message associated with a specific output.
7. A part graph application is represented visually in the visual part graph application area 296 representing the collection of visual part instances 280, and the visual wires 297 that interconnect the Parts. The visual cell region 298 indicated as a dashed line represents a region where visual wires may not pass through, although the wires may enter the region in order to connect to one or more visual part instances that inhabit a visual cell region. The purpose of the visual cell region is to offer some ability for the end-user to manage visual routing of wires.
8. Every message includes a NewMessage status bit. The NewMessage bit is set to true when an output within a visual part instance wishes to signal the presence of a new message to all recipient inputs. The NewMessage bit may be present as the least significant bit in the first byte of a pass-by-value-type message, or the least significant bit in the first byte of a pass-by-reference-type message (for example a pointer to a structure).
9. In addition to the NewMessage status bit, the message typically contains a data payload. The Data Payload within the Message references or contains either a simple data type (for example a Byte, a Uint32 or a byte array), or a structure that comprises a collection of data types. Custom structures may be defined by the OEM.

10. The simplest of all Message types is the Blip message. This is a message that contains no data payload. It simply contains a NewMessage status bit. The Blip is used to indicate the occurrence of an event. For example a Part that is used to report when temperature has risen above a certain level can be configured to emit a Blip message from the Output Terminal to every wire-connected visual input terminal instance.
11. Each visual output terminal instance may offer more than one message type as its message. If more than one message type is offered, the end-user can pick and choose which message type they wish to use.
12. Each input may accommodate more than one Message Type as its message. The input contains an internal list of Message Types that it will accept. When the end-user attempts to connect an output to an input via a visual wire, for example by using a drag and drop operation, the wiring operation will only succeed if the designated input's internal message type list includes the message type of the output that is being wired up.
13. Each Part contains an internal program function named AnalyzeInputs( ) 330, 508. The purpose of AnalyzeInputs( ) is to analyze messages present at the inputs 332, 334, 336, and depending the state of the input messages, optionally present new message(s) to output(s), based on the functional purpose of the part. AnalyzeInputs( ) computations do not normally present output results directly to the output. Instead each output message is cached in an interim output wire memory block 362, 366, 370. Thus each output message is double buffered 360. AnalyzeInputs( ) also must clear the NewMessage bit of each interim output wire memory block that does not have new data. Note that the AnalyzeInputs( ) flowchart 508 in FIG. 5 describes only the general behavior of the function. The final implementation of the AnalyzeInputs( ) function behavior within a Part should ideally be optimized depending on the nature of the Part.
14. If a Part is a Resource Part, then it also may interact with a physical resource such as the device's peripheral hardware. A Resource Part thus may accept input from a mix of peripheral electronics as well as visual input terminal instances 332, 334, 336, and may send output data to a mix of peripheral electronics and to any interim output wire memory blocks 362, 366, 370.
15. The NCE's Master Control Program 120 382 interfaces with, controls and manages the running PGA. A key function in the Master Control Program is the routine that interprets part instances, named SingleStepIterator( ) 502. Within this function, Pass 1 of 2 (504) copies all interim output wire memory blocks to the exposed final output wire memory block(s) for each Part instance. This represents the output state synchronization phase. Pass 2 of 2 (506) calls the AnalyzeInputs function 330 within each part instance. Double buffering of the output state enforces a deterministic "lock step" message passing behavior. For example, if three Part Instances are connected in a sequential daisy chain (a pipeline), then a total of three SingleStepIterator( ) calls (three "Application Clocks") are required to propagate a new message appearing at an input terminal 332 of the first Part Instance in the chain, in order to effect changes to an output terminal 364 of the third and last Part Instance in the serial daisy chain.
16. The order in which the Part Instance AnalyzeInputs( ) 508 calls are invoked does not affect functional behavior of the PGA because Output Messages are double buffered. After AnalyzeInputs( ) has been called for every Part, a second phase transfers each Part's first, intermediate output buffer(s) to the second, final output buffer(s). This ordering-independent behavior also enables parallel processing of AnalyzeInputs( ) calls, if the device that hosts the PGA contains multiple processor cores.

17. The SingleStepIterator( ) 502 function may implement a flag, IsBusy, to determine whether there is any input state change activity, in order to determine whether a processor core may be put to Sleep, as a power saving feature. IsBusy is set to false if there are no new output message state changes for a given Part instance interpretation iteration, and there are also no new hardware (resource) state changes. When this happens, the processor may go into a Sleep state that wakes up upon hardware resource state change (such as a state change of a hardware input pin, or an internal hardware timer).

18. The final output wire memory block 364 internal structure may exist as a data block "by value" or as a pointer to a structure found elsewhere in memory "by reference". A by reference message would be used, for example, if a relatively large structure is used (such as an Ethernet packet). In order to ensure proper double buffering of by reference output messaging, it is important that the Part Instance "ping pong" (alternate) the reference pointers between two distinct memory areas containing two distinct instances of the long messages, whenever there is a NewMessage for the given output terminal. This is necessary in order to decouple the interim output wire memory block 362 from the final output wire memory block 364.

19. Since each part can retain control of the processor as long as necessary, this implementation may be considered "cooperative serial multitasking" from a per-CPU-core perspective. The AnalyzeInputs( ) function within each Part Type should be carefully designed in order to minimize the amount of time that each Part's code has control of the NCE. The function should neither implement delay loops nor wait for data to become available. When possible, use multi-threading and/or multiple CPU technology. Multiple CPUs can be used to simultaneously process the AnalyzeInputs( ) functions within multiple Part instances.

A PGA may also be designed in part or in whole via computer automation instead of being designed entirely by an end-user, technician or programmer.

A PGA may consist of only one Part instance. In this case the implementation of the PGA Designer does not require the ability to connect multiple parts via Wires. In this scenario, one embodiment may be that the PGA Designer may offer a simplified visual application representation to the end-user that does not include Wires and multiple Parts, or if wires are used, both ends of each wire connect to the single part.

Figure 2:
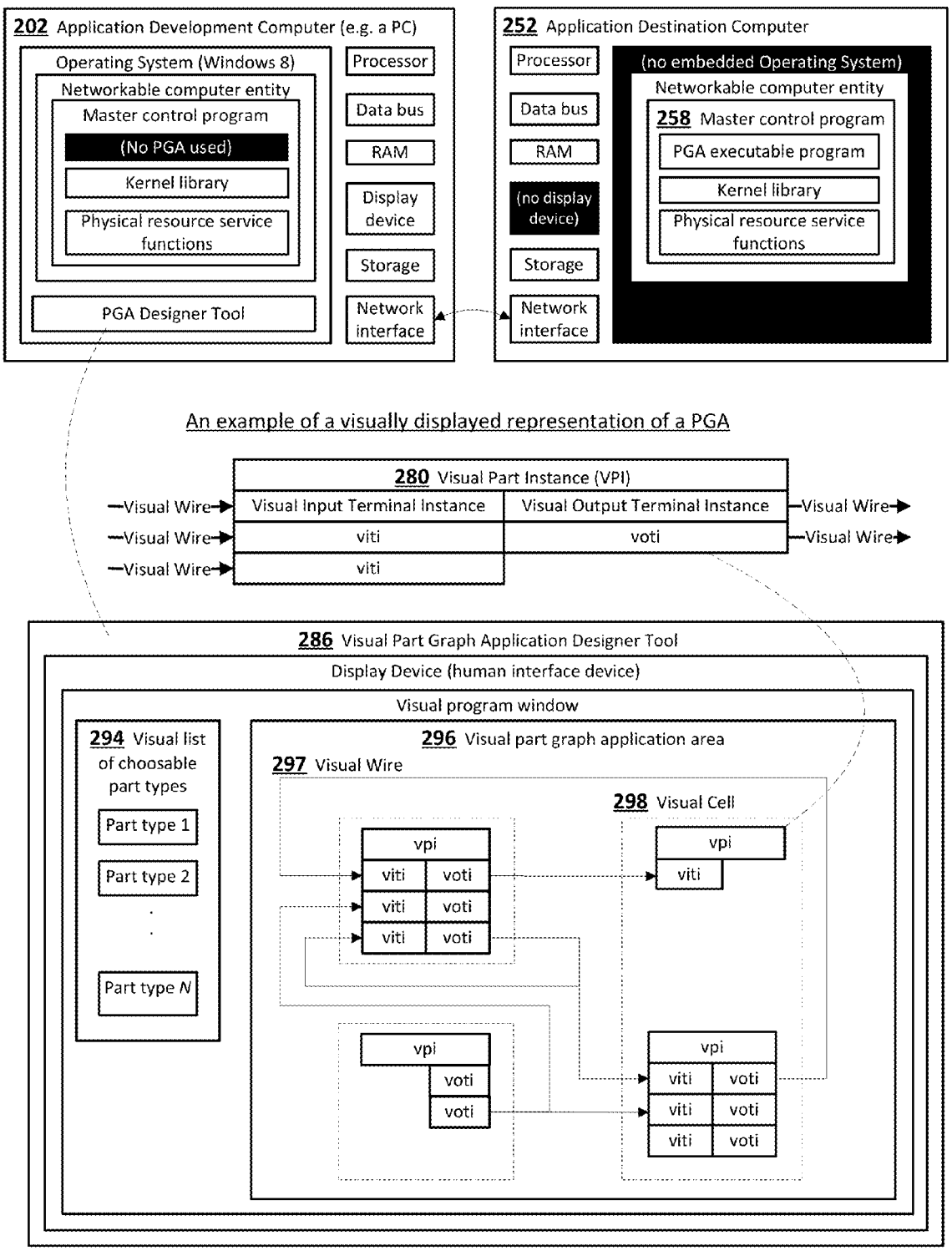
FIG. 2 is an example of one NCE being used to develop an application for another NCE.
Figure 3:
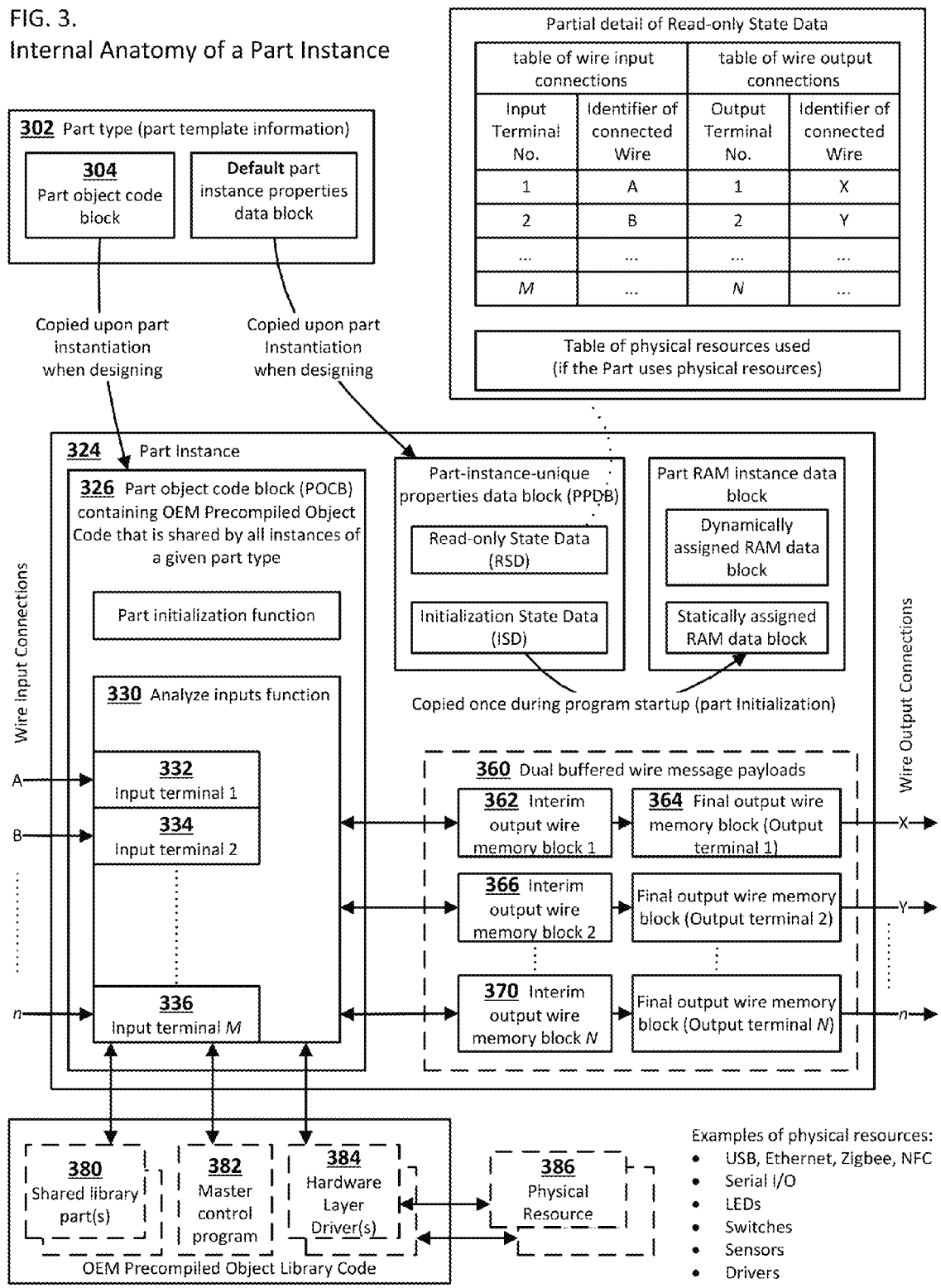
FIG. 3 is an overview block diagram of the internal elements (Anatomy) of a Part Instance.

Referencing FIG. 2, the end-user may pick and choose from a visual list of choosable part types 294.

Part types may fall under but not be limited to the following major categories.

1. A Compute Part can be thought of as a compute-only "black box" that accepts input message(s), performs a computational function using the inputs, and then emits results via output message(s).
2. A Resource Part is a part that inherits the capabilities of the Compute Part, but also serves as an interface to physical resource(s) 386 in the NCE's host hardware. Examples include Resource Parts associated with an LED display, an audio subsystem, an analog or digital input, a hardware timer, a communication channel, or a switch. A Resource Part can receive data from a Resource, send data to a Resource, or both.
3. A Programmable Part (FIGS. 8A, 8B) is a Compute Part that allows the end-user or technician to define a functionality of the part's AnalyzeInputs( ) function using a programming language such as C#.
4. A Cloud Resource Part is a specialized version of the Resource part that provides a means of bidirectional transmission of messages via networking between other NCEs that are physically local or remote.
5. A Macro Part is a Visual Designer appearance/packaging convenience. A Macro Part is a group of interconnected part instances that the visual designer 286 visually displays as a single part. The user can choose a collection of part instances in an existing PGA design, including the wiring interconnection relationships, and then save the collection as a Macro Part. The user can later choose the saved Macro Part; it visually appears similar to a conventional visual part. All the chosen parts are hidden inside the visual Macro Part. If desired, the user may choose to "expand" the Macro Part which results in visually replacing the visual Macro Part with the visual part instances contained in the macro part. Once expanded, the contained parts can be edited or deleted.
6. A Library Part a.k.a. Dependency Part 380 is a part that is automatically included in the PGA when one or more Part(s) in the PGA expresses a dependency on the Library Part, i.e. requires the Library Part in order to function. The Library Part contains sharable object code. Such a part is normally not choosable by the end-user, and the use of a Library Part may be hidden from the end-user, except that it consumes storage space in the target NCE. A Library Part may be shared by more than one part instance or part type in the PGA.

Further, the end-user may drag and drop the following visual icons into the same design work area that contains Visual Parts and Visual Wires.

1. An Off-page Connector provides a means of connecting wires between Pages of the Visual Design Area by visually marking the wires that reference off-pages with unique labels.
2. A Comments Part is used to provide a place in the Visual Design Area for adding comments to the design.

Refer to FIG. 6. Small embedded microcontroller based devices commonly include a built-in, integrated set of hardware features such as parallel I/O, A/D converters, serial communication ports, internal timers, etc. Furthermore, microcontrollers (systems on a chip) frequently offer the ability to flexibly map and assign physical I/O pins to these internal features. Examples include but are not limited to microcontroller offerings from ARM-based chip manufacturers as well as Microchip (PIC) and Silicon Laboratories' 8051 processor.

Almost invariably, today's microcontroller-based devices assign these hard wired pin resources exactly once, when a device is powered up, in device initialization code. Once initialized, that assignment typically remains fixed. The configuration of the microcontroller and its peripherals are often frozen for the life of the device.

This invention offers the ability for the end-user to reconfigure the use of the microcontroller's peripheral resources.

The Resource Part type offers the ability to enable the end-user to flexibly assign these features, within a given end-user's PGA.

FIG. 6 visually walks through the basic process of assigning resources in an example. When a Resource Part has not been associated with an actual resource, the visual part 602 may visually alert the user with a message such as "Needs setup". To complete setup, the end-user opens the property page 604 of the Resource Part. Next the end-user edits the property page 606 in order to assign or change the assigned resources. When properly configured, the Resource Part reports no warnings or errors 608. Note that it is possible to have a Resource Part that does not offer the option to choose; in which case the hardware may be chosen automatically by the PGA Designer. An example of this is if there is only a single resource to choose from. In this case if the end-user attempts to add more than one of the same Resource Part type to a PGA design, the Designer will report a conflict (unless shared hardware access is supported).

The PGA Designer manages the full set of hardware features available and automatically prevents hardware features and physical I/O pins from being inadvertently used by more than one Part, unless a hardware resource is designed to be shared.

Software that services a peripheral hardware resource is called a Hardware Layer Driver 128 384. A resource type part that has been assigned to a hardware resource is mapped to corresponding Hardware Layer Driver(s). For devices the Hardware Layer Driver typically includes the software that handles one or more hardware interrupts associated with the hardware resource. If a hardware resource does not have an associated hardware interrupt, the Hardware Layer Driver may use a hardware interrupt timer that is used to periodically poll the physical resource. The Hardware Layer Driver may allow multiple parts to communicate with the hardware; in which case the Hardware Layer Driver is responsible for managing hardware sharing.

When the end-user programs a small computing device, it is usually for a specific intended use in a specific environment. Switches or jumpers may need to be configured in specific ways, for the device to function for its intended purpose in the intended environment.

With the introduction of this invention, the physical setup requirements for the NCE can vary, depending on how the physical resources are configured by the Resource Parts within the PGA. Physical Setup Requirements Management addresses two needs:
1. Physical setup conflict resolution between Resource Parts within a NCE design.
2. Physical setup conflict resolution between a Resource Part's settings and the physical environment (physical device settings, switches, wiring, connections, etc.).

The end-user picks and chooses from a collection of available Parts. It is possible for the end-user to inadvertently choose two or more Parts that are mutually incompatible with each other because they have conflicting physical or functional requirements.

Refer to FIG. 7A, Managing resource conflicts between Resource parts, for an example Property page for a Resource Part 702, within an NCE design, that manages a binary input pin on a device. This example indicates in the Part Status section 704 that the Resource setting conflicts with the setting on another Resource Part in the design. The other part is named Binary Output #1. In this example, there is a physical switch, S1 that must be set to the OFF position to accommodate the needs of Binary Output #1. At the same time, S1 must be set to the ON position to accommodate the needs of Binary Input #1. The operator using PGA Designer must reconfigure one or more Resource Part's settings until there is no longer a reported conflict in the Property Page. The PGA Designer will prevent the PGA from being fully compiled until this conflict is corrected.

A general purpose input/output pin on a microcontroller chip might be programmable to serve as a digital input (0 or 1), a single bit output (0 or 1) or it may be configurable for a specialized function, such as a bidirectional serial port. Once the end-user programs pin, the specific purpose of that pin becomes hardwired, and it is important that the pin must be connected correctly to the intended electronic hardware.

Refer to FIG. 7B, Reporting Physical Setup Requirements.

The Physical Setup Requirements report is automatically generated by the PGA Designer. It reports to the end-user:
1. Identification of specific electronics, plugs, jumpers, etc. that must be hooked up physically to the NCE, for the PGA to fulfill its intended purpose.
2. Instructions explaining how the switches and other physical controls need to be configured.
3. What dangers there may be that might damage the device (such as connecting two driver output pins that can short circuit each other out).
4. Special power supply voltage and current requirements.
5. Any other relevant environmental configuration requirements (for example report the temperature range that is supported by a device's temperature sensor, required device temperature humidity range etc.).

The end-user can review this report to ensure that the device is properly configured and properly connected to other physical hardware, devices, etc., before deploying the PGA to the device.

The Physical Setup Requirements report includes but is not necessarily limited to the following:
Physical (Hardware) Setup
1. Dipswitches
2. Rotary switches
3. Jumpers
4. Option dongles
5. Optional memory modules
6. Optional feature plug-ins/cards
Connections Setup
1. Bluetooth
2. Near Field Communication (NFC)
3. USB
4. Serial
5. Parallel
Electrical Setup
1. Required voltage and current ranges
2. Voltage stability requirements (for example if there is a sensitive A/D conversion)
Environment Setup
1. Ambient temperature/humidity (effective usable range, as well as absolute maximum ratings to avoid device damage)
2. Physical location
Legal Caveats
Identify whether the chosen Parts have been designed, tested and approved for use in various environments such as those in a closed loop feedback human life monitoring system (when used appropriately).
Performance
Identification of the anticipated worst case and best case system timing latency.

Refer to FIG. 8A. The OEM can choose to offer the Programmable Part as a choosable part in the PGA Designer. This is a Part whose function is defined through the use of a custom scripted program that defines its behavior. The program within the Programmable Part may be written by end-users who have skills in traditional scripted computer language programming. A preferred language platform is managed code, for example the C# language.

The Programmable Part receives input messages, contains part-instance-specific internal variables, and transmits output messages depending on the custom program's response to the input messages.

When a Programmable Part is added to a PGA, the end-user edits the part instance's Property Page 804 in order to specify the number and name of Part inputs and outputs. For each defined input, the end-user specifies which message types it can accommodate (Int32, Byte, etc.). For each defined Output Terminal, the end-user specifies which message types may be generated by the terminal 806. By doing so, the PGA Designer is aware of the terminal properties so it can determine whether to allow or disallow wire connections between the Programmable Part and other Parts in the PGA.

Refer to FIG. 8B for an example of a programmable part script, using the C# language. The purpose of the automatically generated code (bracketed with #region/#endregion) is to identify the message type choices that are available for the Input Terminals and Output Terminals.

The program contained with each programmable part is run at every parts enumeration cycle, when the PGA is not sleeping.

To maximize overall NCE performance, the programmer should include early exit tests near the beginning of the custom program. For example, the Compute( ) function above should exit early if no Input Terminals contain new messages.

The offered feature set of the language may need to be restricted if the target device has limited computing power or resources. For example, a minimal implementation may contain only very simple arithmetic tests and simple "if/then" statements.

A more feature rich programming language would include the ability to perform database-like lookups (for example, LINQ).

The script language may be interpreted, compiled, or a mixture of the two. For example, the program can be compiled into an intermediate form such as CIL, and the CIL might then be either interpreted (similar to .NET Micro Framework), or compiled/JITted.

If the programming operator "new" is used dynamically, during normal program runtime in order to create new instances of class objects, this causes memory to be allocated, and then deallocated when variables are no longer referenced. This results in the need for a periodic garbage collection to reorganize memory, which may produce unacceptable real-time performance results. Therefore several options should be considered with respect to memory management:

1. In order to maintain "real-time" performance, the language may be implemented in a way that the "new" operator is used only during part initialization, in order to avoid the need for dynamic heap garbage collection. Memory allocations are set up only once during initialization.
2. The language can make provisions to control when garbage collection is allowed to occur. For example, use methods such as GC.pause( ), GC.resume( ) and GC.collect( ) together with careful programming with respect to allocating or deallocating memory objects, and make provisions to enable a garbage collection event to be triggered when total free memory falls below predetermined thresholds.

In order to minimize the performance penalty/latency associated with garbage collection, one option is to initialize heap memory as a collection of fixed length memory pages. Then manage memory through linked list management. This would impose restrictions on how to use the allocated memory owing to the linked list behavior of the memory.

The memory heap model may be avoided completely if temporary data is maintained only in the following places:
1. On the local stack as local temporary data.
2. Using pre-allocated persistent per-part instance static variables only (allocated upon PGA startup).

Examples of Programmable Part Implementation Scenarios:
1. FIG. 8B is an example of a message type converter, that can convert an input message's numeric value into a human readable ASCII string or into a different numeric type.
2. General logic or arithmetic computation.
3. A system state controller for keeping system synchronized (by shepherding, controlling and massaging messages and emitting new messages depending on current state). It contains persistent variables that can be used to manage overall system state, and can emit output messages as a function of both current system state and received input messages.
4. A custom database implementation.
5. For testing and debugging. The end-user can create an output message that emits a message only when specific test conditions occur. The end-user can then use the PGA Designer's testing feature to mark that Output Terminal as a testing breakpoint, i.e. halt execution when a message of interest occurs on the Output Terminal.

The end-user may use the Programmable Part in conditional debugging.

When the end-user is testing and debugging, the end-user may finely tune the conditions that cause the tester/debugger to halt by creating a condition that sends a message to a Programmable Part's output pin when the condition is hit, and then specifying a debug halt that includes the name of the output and additional debug parameters such as:
1. Number of hits before halting.
2. Specific value or range (this can be set in the programmable part).
3. Detecting when the rate of change of the message value falls within a defined range.

A NCE may have multiple PGAs installed in persistent storage (such as in flash memory storage) and be ready to run. In such cases, the PGAs each have an ordinal ID. The PGA that executes by default upon startup has an ordinal ID of zero.

PGA zero can be used to select and launch in turn alternative designs that are preloaded into the NCE (designs with ordinal IDs of 1 through n). The OEM may choose to create a special part that the OEM might name the PGA Launcher part. This part is present in the default PGA (PGA zero) and can make decisions regarding what subsequent runtime to launch (PGA designs 1 through n).

For example PGA zero might inspect the NCE hardware host switch settings etc. to determine which working PGA to launch.

PGA zero may also choose to launch a Self Test Part before launching the intended normal runtime PGA. The self-test may be optionally invoked depending on whether a switch or push button is engaged when the PGA host hardware is reset.

A Native Application 124 is an application that is created using the conventional programming tools traditionally used when developing conventional software applications for the associated target device. A programmer can write conventional applications that communicate with other NCEs by using the NCE Manager APIs and the Kernel APIs.

The Kernel 126 is roughly analogous to the traditional definition of an operating system kernel, including a kernel API library interface. What it contains and does, depends on parameters such as the target hardware that it runs in, whether or not NCE is hosted (nested) within another operating system.

Embedded microcontrollers that have minimal resources would likely host a NCE in the complete absence of a host operating system, other than NCE itself. In such cases, the Kernel must contain the classic low level operating system capabilities to handle:
1. Bootstrap and/or startup routines.
2. Watchdog timer.
3. Peripheral Interrupt Service Routine Manager.
4. Hardware timer services.
5. Etc.

If the NCE is hosted within another operating system (such as Windows or Linux), then the above functions may be optionally be disabled or stubbed, for example the bootstrap code that is used to initialize memory.

In all cases the kernel presents a consistent interface to all components above it.

The Hardware Layer Drivers 128 function at the hardware interface layer. These drivers expose a consistent interface to the layers above it, enabling the upper software layers to interface with device peripherals in a uniform manner.

If there is no Host Operating System layer in the NCE, then the Hardware Layer Driver interfaces directly with the physical hardware in the device, performing direct hardware I/O and reacting to hardware interrupts.

If there is a Host Operating System layer in the NCE, then the Hardware Layer Driver interfaces with the corresponding Host Operating System in order to gain access to peripheral hardware. For example, in the case of the Microsoft Windows operating system, hardware is accessed using the appropriate Windows APIs; those APIs in turn interact with the corresponding kernel mode or user mode device drivers, which in turn interact with the peripheral hardware.

It is helpful to apply a real world usage scenario.

Consider a small electronic device whose purpose is to enhance hobby market radio control toys with special audio and video effects, and allow the end-user to control those effects by leveraging the unused channels in a hobbyist's radio control system. FIG. 2 illustrates an Application Development Computer 202 and an Application Destination Computer 252, where the latter computer is a device. Referencing FIG. 10A, system diagram 1001 outlines a model aircraft special effects generator, for a working (flying) scale model P51 Mustang aircraft of World War II vintage. FIGS. 10B through 10G describe the property settings for the Parts found in the example PGA.

FIG. 9 is helpful to describe the mapped relationship between the Networkable Computer Entity Model 902 and this specific scenario. This scenario involves a Desktop PC 904 and a small embedded device 906 (the special effects generator 1006).

The device will reside on board the P51 Mustang model. Radio control transmitter 1002 wirelessly connects to radio control receiver 1004 where receiver channels 3 (throttle), 4 (Gun), and 5 (audio volume) are used to control sound and lighting effects for a simulated machine gun, and to simulate the sound of the Rolls Royce engine that was originally used in the real aircraft.

The hobbyist programs the special effects generator using a PC that is hosting the Visual Part Graph Application Designer Tool. FIG. 10A shows the completed design 1008.

In this example, the PC connects to the device using a USB cable.

The end-user uses the following steps to create and deploy design 1008:

1. Launch the Visual PGA Designer software on the personal computer. Create a new empty PGA.
2. The visual design page contains a collection of rectangles, each rectangle using a dashed outline. Each of these dashed rectangles is called a Cell. Each Cell accommodates one or more Parts. If more than one part is added to a Cell, the Parts accumulate in a vertical arrangement within the Cell. The margin gaps between the Cells on the design page are called Wire Channels 1010. When the end-user wires up the Parts, the corresponding interconnecting Wires will visually appear in the Wire Channels. The wires are visually routed and spaced automatically and dynamically by the PGA Designer, in order to present a visually appealing and easy to follow wiring layout to the end-user.
3. Drag and drop the following Parts into the visual part graph application area.
   3.1 Three instances of the "RC Input" part
   3.2 An instance of a Graph Transform. This will be used to translate the throttle control (which ranges from 0-255) into a range of (0-15) that is used to select a different engine MP3 audio file depending on the throttle level.
   3.3 Two Sound Player parts. One will be used for the engine sound and the other will be used for the machine gun sound.
   3.4 A Sequence Player part. This part uses a lookup table file to modulate the intensity of the machine gun light effect.
   3.5 An LED PWM Driver part that is used to modulate the brightness of the machine gun LED via Pulse Width Modulation (PWM).
   3.6 A Range Detector part. This part will be used to monitor Channel 4 which is the machine gun trigger, and depending on its input, sends messages to stop or start the Machine Gun.
4. Edit the Properties of each part (FIGS. 10B, 10C):
   4.1 For each RC Input, where 1020 is one example, create a Friendly Name for the output message so the PGA is more easily understandable. Set the number of running samples averaged to 3, which helps dampen signal jitter due to radio control signal noise. Assign physical radio control input channels to each Part. Since there are three RC Input parts the end-user needs to assign a unique physical radio control input channel for each.
   4.2 Edit the Range Detector part 1022 so it is configured to detect two input numeric ranges, 0-127 and 128-255. This part will emit a different Blip message for each condition, used to turn the machine gun on or off.
   4.3 Edit the Sound Player Parts, where 1024 is an example, by assigning an audio channel to each. Then check the Loop mode checkbox so the sound will repeat, and supply a path where the audio files are found in the personal computer. For this implementation, the actual audio files in the supplied path require numeric names, i.e. 0.mp3 1.mp3, 2.mp3, . . . 15.mp3.
   4.4 Edit the Sequence Player part 1026 similarly to the Sound Player Parts. Instead of a sound file (.mp3), sequence files (.seq) are used. A sequence file contains a list of numbers that are emitted as a timed sequence with a fixed time delay between them. The Sequence Player emits these numbers as its output. This PGA will use this to modulate the intensity of the machine gun light for a realistic simulation.
   4.5 Edit the Graph Transform part 1028, 1030 so it represents a straight line (linear) transform.
   4.6 Edit the LED PWM Driver part 1032 by choosing the hardware pin that is connected to the machine gun LED strobe.
5. Use Drag and Drop to add Wires between the Parts with the end result as seen in 1008. Note that as the end-user adds Wires, the wire path chosen is performed dynamically and automatically by the Setup software, so the wires are visually aesthetic and easy to follow.
6. The end-user can move Parts around on the design page via drag and drop, and the corresponding Wire connections are automatically, dynamically rerouted. This feature is useful for optimizing the appearance of the wire routing in the visual design.
7. Once the end-user has developed a PGA to a point where it is ready for testing, the next step is to instruct the PGA Designer to deploy the PGA design to the target NCE. Alternatively, if the OEM published a Simulation of the NCE, the end-user can test the PGA in the Simulation on the Visual PGA Designer; an option which does not use the physical NCE target. In this example, the PGA Designer itself executes the following steps when deploying the PGA to simulator software or to the target physical PGA:
1. Perform PGA design validation in the following steps 1.1-1.9:
1.1 The PGA contains at least one Part.
1.2 Any Mandatory Parts are included. These are Parts that may be required for the particular target Hardware.
1.3 If any Part has a dependency on the presence of other Part(s) the required dependent Part(s) is/are included.
1.4 There are no physical peripheral hardware resource assignment conflicts.
1.5 There are no Physical Setup Requirements conflicts.
1.6 For each Wire, there are no Message Type compatibility problems between Part Input Terminals and Part Output Terminals.
1.7 There are no Part Instance Count limits, for each Part that has an enforced limit on the number of Part instances (copies) allowed in a PGA.
1.8 The PGA does not exceed the Flash and RAM memory capacities of the NCE.
1.9 The Parts type collection used is compatible with the target NCE hardware; this includes a check of the OEM-unique ID, the hardware-unique ID, and the hardware revision ID.
2. Generate a Physical Setup Requirements Report.
Display the Physical Setup Requirements report to the end-user. An example of such a report is in FIG. 7B. This serves as a checklist for the end-user to ensure that the target NCE is setup correctly to accommodate the particular PGA that is being sent to it and to ensure the target NCE is configured correctly (switches, jumpers, cables etc.).
3. The PGA Designer compiles the designed PGA into a form that can be transmitted to the NCE in the following steps 3.1-3.8.
3.1 Each Part has a corresponding internal program that is persisted in its Part Object Code Block (POCB) 304. The OEM has precompiled the code for the part into a conventional relocatable object code module format such as OBJ. The application that is ultimately downloaded into the NCE (or simulated version thereof) requires linking to other OBJ modules in order to integrate the complete PGA and to create an executable application containing absolute program addresses (EXE). Historically, other design implementations typically allow a programmer to graphically develop source code at the visual level that in turn is compiled to OBJ and the EXE files. This invention decouples the development of OBJ modules from the end-user. The OEM is established as the entity responsible for developing, testing and approving Parts which manifest as precompiled OBJ modules.
3.2 Embedded within each part's precompiled object code module are the part Initialization function, and the part's AnalyzeInputs( ) function.
3.3 Each Part in the PGA contains precompiled per-part-instance Part Data Block (PDB) that contains part-instance-unique information such as the Property settings for the part. The PGA Designer compiles the collection of all Parts in the PGA into a single Parts Data Collection (PDC) which in turn is compiled into OBJ format to enable it to be linked into the final compilation.
3.4 FIGS. 10D through 10G list an example of one chosen implementation of the PDB. The PDB is divided into three data sections. The first section is the PGA Instance Header Block, as read-only state data, which contains pointers to all major structures within the PDB. The second section contains the initial part state data (ISD) block that is used to initialize system memory (RAM) for the first time only, upon NCE initialization or reset. The ISD contains initial values for all Part interim and final Output message(s) and initial values for all instance data unique to every Part in the PGA. The ISD may optionally be compressed in order to reduce the amount of flash memory required.

The third section contains the collection of Read-only State Data (RSD) for the collection of Parts in the PGA. Read-only state data can be referenced directly from read-only memory (assuming the RSD is present in fully-addressable NOR flash). Therefore no copy action is required.

For this example, the instance data is structured compactly and efficiently in order to best accommodate the limited resources of small devices. Here the entire PGA is defined in 607 (0x25F) bytes of flash storage, and 53 bytes of system memory (RAM). The minimal RAM footprint is notable and important, because the least expensive microcontrollers tend to have a very limited amount of available RAM.

In processors that are not as resource constrained, if desired the PDC structure can be designed more for programming convenience rather than compactness.

3.5 For each Physical Resource assigned within each Part (for Parts that use Resources), include the corresponding Hardware Layer Driver, also in the form of an OBJ file. The Hardware Layer Driver includes all the control logic software for managing hardware resources, including but not necessarily limited to the Application Program Interfaces (APIs) used by Parts to access the resource, and Interrupt Service Routines (ISRs) used to respond to hardware interrupts.

3.6 Include any required or optional object library modules. A common use of a library file is to contain common software functions that are shared by code in more than one POCB 326 or Hardware Layer Driver 384.

3.7 Link the above collection of code, data and library module(s) into the final PGA package to be transmitted to the NCE (to the device or the device simulation). If the target is the physical device, then the code and data is compiled and linked for the corresponding target NCE (which use microcontroller architectures such as ARM, PIC etc.). If the target is the Simulator, the appropriate part instance data is compiled, and the PGA's code and data are linked (using a linker) to specifically accommodate the personal computer's native processor.

3.8 If there are sufficient memory resources in the NCE, an option is to pre-compile all the POCBs 326 for all the Parts and all the Hardware Layer Drivers for all the Resources into a single object module, instead of selecting and including only those code modules specifically required by the end-user's PGA. If this option is chosen, the uniqueness of the PGA is established completely by the per-part-instance data for each Part present in the PGA. An advantage of this approach is that it is easier for the OEM to test the product, as there are fewer dependency related test case combinations. A disadvantage is that the resulting compiled module is larger than it needs to be, since a full code build likely contains software for Part(s) and Hardware Layer Driver(s) that are not actually used in the specific PGA.

4. Transmit the PGA to the NCE (or simulated version thereof). Physical transport layers include but are not limited to USB, Ethernet, Bluetooth, ZigBee, IR, and RS232. The end-user can choose to visually test and debug the PGA, or the end-user can proceed to deploy and run the finished PGA without testing visually. If testing, proceed to step 5 below. If running without testing, proceed to step 6 below.
5. Follow the steps 5.1 to 5.3 below if testing the PGA. In this operational mode, the personal computer downloads the PGA to the device and then maintains interactive communication with the device, allowing the end-user to single step through a PGA, observe message contents etc.
5.1 Refer to FIG. 4. Issue a PgaClearCommand 409 to the NCE. This changes the state of the NCE to NoPGA.
5.2 Transmit the PGA to the NCE, by sending a LoadPgaBeginCommand, followed by a collection of LoadPgaDataCommand(s) and ending the collection with a terminating LoadPgaEndCommand.
5.3 The NCE initializes the PGA and then switches from InitializingPga 414 to TestingPga 420 state. At this state the NCE can be tested using the PGA Designer's visual Parts Design area, where the end-user can test, debug, inspect and edit Parts messages, single step, and so on.
6. Follow the steps 6.1 to 6.3 below if running the PGA (without testing). In this operational mode, the Setup computer downloads the PGA to the NCE and then commands the NCE to run.
6.1 Issue a PgaClearCommand 409 to the NCE. This changes the state of the NCE to NoPGA.
6.2 Transmit the PGA to the NCE, by sending a LoadPgaBeginCommand, followed by a collection of LoadPgaDataCommand(s), and ending the collection with a terminating LoadPgaEndCommand.
6.3 The NCE initializes the PGA and then switches from InitializingPga 414 to TestingPga 420 state. Issue a RunCommand to the NCE. This sets the NCE state to Running. If the particular PGA requires no interaction with the Setup computer then the data link between the Setup Computer that hosts the PGA Designer and the NCE target may be disconnected if desired; in which case the NCE target runs autonomously.

Here are a few more real world scenarios.
1. A Home Automation System
Use a Personal Computer (PC) to manage a network of home automation devices within a home. The end-user creates a custom PGA that runs on the PC and is used to manage the devices in accordance with the end-user's needs and desires. The PGA running on the PC can offer a visual representation of all the devices in the household, and also offer management, monitoring, and scheduling capabilities. The NCE implementation in the personal computer uses pure managed code.

Each home automation device serves to control various electrical and electronic devices in the home. The end-user can create a custom PGA for each device as desired and fine tune the behavior of each device. Examples of these devices include lamp controllers, fan controllers, and electronic power switches. The devices are physically located throughout the home. The NCE implementation in these devices uses pure unmanaged (native) code.

The PC can communicate with the devices, and the devices can communicate with each other. For this example, these devices use the Zigbee wireless protocol, and the PC contains a Zigbee wireless host controller.
2. Small Devices that Typically Operate Standalone
A home PC is connected to a small USB device to enable the end-user to program a PGA into that device, using the PGA Designer software. After programming, the user disconnects the device and the device runs standalone. An example would be a programmable greeting card that connects to the PC via a USB cable, and the end-user can customize its audio and LED effects.
3. Small Devices that Typically Remain Connected to a PC
The same setup as above, except the device remains connected to the PC. The end-user programs the device via the PGA Designer to serve as a functional peripheral to the PC, for example as an input device for monitoring weather or collecting data (instrumentation). Custom applications on the desktop can interact with the custom-programmed device, or the device can manifest itself as a keyboard, joystick, mouse or storage device.
4. Simulation of Small Devices within a PC
The same arrangement as above, except the small devices are simulated via simulation PGAs running in the desktop PC. This enables local setup scenario testing, or demonstration of a home automation system before needing to purchase the small device hardware.
5. OS Virtualization Scenarios
Any of the above scenarios, except the end-user uses virtualized PC technology to create instances of NCEs running within virtual OS instances.
6. Educational Scenarios
   6.1 Use Simulation in a desktop PC in order to facilitate PGA design training.
   6.2 Leverage the PGA visual programming system to enable training of simulated technologies. For example, simulate computer logic by creating Parts that represent hardware modules such as data latches and logic gates (AND/OR/NAND/NOR etc.).

Testing the PGA
FIG. 11A illustrates one possible manifestation of a PGA test procedure. The PGA Designer provides the end-user with the ability to interactively test and debug a PGA, in the PGA visual design area 112 296.

PGA Designer can run the PGA application on the target NCE. Instead of free running, the end-user can choose to single step the PGA application (or simulation). This is accomplished by setting the state of the PGA within the NCE, to TestingPga 420. When in this state, the Designer can issue SingleStepCommand(s) to the PGA. This has the effect of calling SingleStepIterator( ) 502 once.

Single step mode offers the ability to visually monitor the state of the messages being passed between the Parts in the PGA design.

As shown in FIG. 11A:
The Properties page 1102 contains a debug checkbox. When checked, a Message Test control button 1106 appears for every Input and Output Terminal in the Part.

Within the visual part 1104 click on the Message Test button 1106 once. The Part will display a read-only value of the message. If the message is too big to feasibly fit into the visual Part, only a portion of the message is shown, but the end-user can click on the message to see the whole thing, or create a "watch" window that appears elsewhere in the Designer.

A second click of the same Message Test button 1110 results in displaying a modifiable value within the message, i.e. the end-user can click on it and change its value in between single steps.

When the end-user changes the value of a message manually 1114, the PGA Designer tool will send any Part Output Message modifications directly to the target device. When the end-user single steps, the target device will step (SingleStepIterator 502) using the modified Output Messages; the modified message(s) will be used, and will propagate to any connected Parts as expected.

The end-user can have the PGA Designer automatically launch single step commands at user-choosable intervals. This way the end-user can control the speed at which the PGA runs, while watching the various messages change on the Designer screen. FIG. 11B is one representation of a PGA Tester control panel. In the Figure, the Start Monitored Run button launches this mode, while the Monitored Speed Control slider controls the rate at which timed Single Steps execute.

One possible manifestation is to enable the end-user to configure PGA Designer to emit visual and audible feedback as it single steps. For example, the Part terminal and the Wire can momentarily flash, and an audio effect can be launched each time the message changes value.

The end-user can configure Monitored Run so that it will halt running when certain message states or conditions have occurred. The end-user specifies the desired break conditions by instructing the PGA Designer to compare message state information against manually entered break criteria. This behavior is similar to Conditional Break as used in other programming environments.

The invention claimed is:

1. A method for developing a computer application, comprising:
   (a) an application development computer that comprises a processor, data bus, random access memory, a display device, a network interface and running a suitable operating system, and a storage means on said application development computer for storing executable applications,
   (b) an application destination computer that comprises a processor, data bus, random access memory, a network interface and a storage means on said application destination computer for storing executable applications,
   (c) providing a part type to serve as a software prototyping template used to create part instances, said part type containing a part object code block representing intermediate computer memory address-independent compiled software that can be linked into an executable part graph application executable program using compiler linker technology, said part object code block defines the computational behavior of said part type, and a default part instance properties data block representing the initial default data settings for said part type,
   (d) providing said part instance that inherits functionality and state from said part type, said part instance comprising said part object code block containing said part graph application executable program defining the functional behavior of said part type, a part instance properties data block initially populated with said default part instance properties block representing data settings that are editable by human or another computer process in order to customize said part instance, and a part ram instance data block representing random access memory that is available and modifiable by said part graph application executable program present in said part object code block,
   (e) said part ram instance data block comprises a statically assigned ram data block containing data that remains fixed in the same location within memory, and a dynamically assigned ram data block containing data,
   (f) said part instance properties data block comprises initialization state data that is used to initially populate the contents of said statically assigned ram data block and comprises read only state data that contains constant data that does not change for the life of said part instance,
   (g) providing in said part instance zero or more final output wire memory blocks each representing a block of computer memory that contains a message payload, and logically represented as a part's output terminal, said message payload whose structure includes a new message indicator with a true or false bit, which when set to true, indicates presence of a new message,
   (h) providing in said part instance zero or more interim output wire memory blocks each representing an assignment of memory that is large enough to contain a lossless copy of its associated said final output wire memory block, serving as an intermediate memory storage buffer used to synchronize said message payload state,
   (i) providing in said part instance zero or more input terminals each representing a part reference memory address entry point that can be assigned to said output terminal of same or different instance of said part instance, and as each relationship is established it is logically referred to as a wire,
   (j) providing a table of wire input connections within said read only state data within said part instance that specifies the logical connection association between each said input terminal and the other end of said wire connected to said output terminal,
   (k) providing an analyze inputs function within said part object code block, whereby said analyze inputs function performs a computation unique to the specific said part type, said computation obtaining input data from current contents of said part ram instance data block and zero or more received data messages available by inspecting said table of wire input connections, and posts updated computation results into one or more said interim output wire memory blocks,
   (l) providing for a master control program, executing in said application destination computer whose function includes receiving and then programmatically executing said part graph application executable program,
   (m) providing for a part object module code linker program that combines said master control program, a collection of one or more said part instances, producing said part graph application executable program for use in said destination computer,
   (n) providing for a single step iterator algorithm that comprises two execution passes where in the first pass, said part graph application executive program transfers the contents of each said interim output wire memory block to its corresponding said final output wire memory block within each said visual output terminal within each said part instance, and in a secondary pass, for each said part object code instance, said single step iterator algorithm calls said analyze inputs function associated with said object code instance,
   (o) providing for a parts executive program which repeatedly executes said single step iterator algorithm in the course of operation of said part graph application executable program within said application destination computer.

2. The method of claim 1, wherein said part graph application executable program is transmitted to a plurality of said application destination computers.

3. The method of claim 1 wherein said application development computer also serves as said application destination computer.

4. The method of claim 1 wherein if said master control program detects there is no said part graph application executable program loaded in storage, said master control program will wait until said part graph application executable program is received.

5. The method of claim 1 wherein said master control program enters an operational mode whereby said single step iterator algorithm is executed only when commanded to do so by said application development computer for application debugging purposes, whereby said user may single step said part graph application.

6. The method of claim 5 wherein said application development computer may exchange messages with said application destination computer before or after execution of said single step iterator algorithm, whereby said user of said application development computer may monitor, test and debug said part graph application executable program.

7. The method of claim 5 wherein said application development computer may transact with said application destination computer in order to modify any memory within before or after execution of said single step iterator algorithm, whereby a user may modify behavior of said part graph application executable program for testing and debugging purposes.

8. The method of claim 1 wherein a part initialization function within said part object code block is executed by said master control program once for each said part instance, prior to startup of said part graph application executable program.

9. The method of claim 1 wherein said part instances that are based on the same said part type share the same said part object code block.

10. The method of claim 1 wherein prior to execution of said part graph application executable program data or code resident in random access memory storage is copied to an alternative faster said random access memory storage in order to achieve higher program execution speed.

11. The method of claim 1 wherein a resource part type and corresponding resource part instance contains said analyze inputs function that in addition to previously described function, also accesses peripheral input output ports, peripheral communication ports, network communication interfaces and electronic interfaces in said application destination computer.

12. The method of claim 11 wherein said part instance properties data block includes information identifying which resources are accessed by said analyze inputs function.

13. The method of claim 11 wherein one or more processors are set into reduced power operation state if no changes are detected in any said interim output wire memory blocks that have said wire connection and no changes are detected in peripheral hardware inputs that said resource part type instances are monitoring.

14. The method of claim 11 wherein said part initialization function includes initialization of said peripheral input output ports, said peripheral communication ports, said network communication interfaces and said electronic interfaces in said application destination computer.

15. The method of claim 11 wherein if an attempt is being made to assign a resource that has already been assigned to a different said resource part instance or if said resource is not shareable, creation of said resource part type instance is automatically canceled or assigned to an alternate resource.

16. The method of claim 1 wherein a plurality of processor cores within said application destination computer interpret the collection of said part instances using parallel processing techniques, by assigning the task of part interpretation across a collection of available said processor cores, whereby a reduction in the real time required completing parts interpretation is realized.

17. The method of claim 1 wherein a plurality of computers connected locally or via a network interpret the collection of said part instances, whereby the task of executing said analyze inputs functions is distributed across said plurality of computers.

18. The method of claim 1 wherein a programmable part type and corresponding programmable part instance contains said analyze inputs function compiled from user written program script.

19. The method of claim 1 wherein a library part type and corresponding library part instance contains library object code that is sharable and referenced by one or more said part object code blocks.

20. The method of claim 19 wherein said library part instance is automatically added to said part graph application executable program during the code linking phase whereby object code linkage dependency requirements are fulfilled.

21. The method of claim 1 wherein a plurality of said part graph application executable programs reside and execute simultaneously in said application destination computer.

22. The method of claim 1 wherein a portion or all of said part object code blocks are pre-installed into said application destination computer whereby only said part instance data blocks that define the unique settings for each said part instance within said part graph application executable program require transmittal to said application development computer.

23. The method of claim 1 wherein said application destination computer is a computer simulation of a physical computing device.

24. The method of claim 1 wherein the same said part type may be instantiated more than once in said part graph application executable program.

25. The method of claim 1 wherein the copying of said interim output wire memory block to said final output wire memory block is instead accomplished by exchanging the memory pointers that reference said interim output wire memory block and said final output wire memory block, whereby said interim output wire memory block and said final output wire memory block are swapped in a ping pong fashion.

26. The method of claim 1 wherein said user may specify, for a specified subset of said part instances that are interconnected via said wires, the order of execution of said part instances within said subset, and said parts executive program processes subset of said part instances in the same pass, whereby said subset is executed as a single said part instance.

27. The method of claim 26 wherein if said output terminal assigned to said part instance in said subset does not connect to a wire leading outside said subset, the step of copying said interim output wire memory block to final output wire memory block is omitted, and said analyze inputs function posts its computation results directly to said final output memory block, whereby execution of said analyze input functions within subset of said part instances is accomplished in a single execution pass in user specified order.

28. The method of claim 1 further comprising:
(a) A visual part graph application designer tool representing a software tool used by said user to visually design computer applications, executing in said application development computer,
(b) Said visual part graph application designer tool providing a visual program window presented on said display device, whereby said visual program window represents a visual work area to receive and contain other visual objects, (c) Providing a visual part graph application area presented within said visual program window,
(d) Said visual part graph application area represents a visual work area to receive part graph application visual objects, whereby the collection of said part graph application visual objects visually represents said part graph application,
(e) Providing a visual list of choosable part types that is displayable in said visual program window, said visual list of choosable part types providing a means of visually representing a list of one or more user choosable said part types,
(f) From said visual list of choosable part types said user is provided with a means of selecting one or more of said part types from said visual list of choosable part types, and each time said part type is chosen by said user for use in said part graph application a corresponding said part instance is created that contains a copy of said part type in said part graph application, each said part instance is represented visually as a visual part instance in said visual part graph application area,
(g) Providing a visual input terminal that is displayable on said display device and logically associated with said part instance, said visual input terminal visually representing said input terminal that can be visually selected by said user,
(h) Providing a visual output terminal that is displayable on said display device and logically associated with said part instance, said visual output terminal visually representing said output terminal that can be visually selected by said user, and programmatically associated with the computer address of said output terminal,
(i) Providing a visual wire that is displayable on said display device, said visual wire representing a means for said user to visually interconnect said visual output terminal to said visual input terminal, establishing the connection relationship between said output terminal and one or more said input terminals, and said input terminal becomes programmatically mapped to the data in said final output wire memory block that is represented by said output terminal,
(j) Providing for zero, one, or a plurality of said visual wires, whereby said visual part graph application may contain one or a plurality of said visual part instances, each said visual part instance may be interconnected to other said visual part instance via zero, one, or a plurality of said visual wires,
whereby said user develops and tests said part graph application executable program using said visual part graph application designer tool on said application development computer for intended deployment to said application destination computer.

29. The method of claim 28 wherein said visual input terminals and said visual output terminals associated with said visual part instance are visually positioned to appear physically attached to, or in the immediate proximity of the associated said visual part instance whereby the logical relationship between said visual input terminals, said visual output terminals and said visual part instances is clear to said user.

30. The method of claim 28 wherein said visual part graph application designer tool provides a means of visually inspecting, retrieving and storing said part graph applications using said display device.

31. The method of claim 28 wherein a visual part properties dialog is provided as a representation of user editable part object instance variables whereby said user may edit the data within said part instance properties data block by adjusting parameters that are unique to said part instance, including number and characteristics of said visual input terminals and said visual output terminals.

32. The method of claim 31 wherein said visual part properties dialog includes at least one visual helper graphic whereby said visual helper graphic facilitates said user in identifying said part object instance settings such as physical connection relationships.

33. The method of claim 31 wherein said visual part properties dialog includes said resource choices whereby said user customizes said part instance properties data block to specify which said resources are used.

34. The method of claim 28 wherein each message output terminal is user editable whereby said user may choose the structural type of said message payload.

35. The method of claim 28 wherein said visual part graph application area is visually partitioned into a plurality of graphical work pages, each said graphical work page appearing as a visual window on said display device and each visual wire that crosses the border between two graphical work pages is labeled on both sides of the border crossing with an off page connector icon whereby each said visual wire is uniquely marked.

36. The method of claim 35 whereby said user may choose to visually hide one or a plurality of said graphical work pages from view, whereby more visual area becomes available for viewing those pages that remain unhidden.

37. The method of claim 35 wherein said graphical work page aspect ratio is proportionable to accommodate one or more of the user printer page aspect ratios and said user has a means of instructing said visual part graph application designer tool to transmit said graphical work page to a printer device.

38. The method of claim 28 providing a visual comments part type, which when chosen by said user appears as a visual comments part instance whereby said user may include user customized comments in said visual part graph application area.

39. The method of claim 28 providing a visual macro part type encompassing a collection of said visual part instances, said part instance properties data blocks and said wires interconnecting said visual part instances, whereby said visual macro part type becomes visually rendered as a single part type in said visual part graph application area.

40. The method of claim 39 wherein said visual macro part type is saved in storage and then later retrieved from storage for reuse in same, different, or new said visual part graph application.

41. The method of claim 39 wherein said application designer tool provides for expanding an instance of said visual macro part type resulting in rendering all contained said visual part instances and said wires interconnecting said visual part instances in said visual part graph application area, whereby said user may subsequently inspect, edit or delete the rendered said visual part instances.

42. The method of claim 28 wherein said visual part graph application designer tool automatically and dynamically repositions said visual wires in said visual part graph application area to ensure said visual wires do not overlap visual part instances or lie on top of other visual wires, whereby said user does not require manual wiring position editing.

43. The method of claim 42 wherein said user may prohibit said visual wires from overlapping specific visual regions by visually specifying one or a plurality of visual wire exclusion regions.

44. The method of claim 43 wherein said visual part graph application designer tool may specify a visual cell region that prohibits visual wires from visually passing through said visual cell region, said visual cell region containing one or more said visual part instances.

45. The method of claim 28 wherein said visual part graph application designer tool automatically repositions visual parts in said visual part graph application area order to minimize the aggregate total sum all visual wire lengths in said visual part graph application area.

46. The method of claim 28 wherein said user adds said visual part instance by using a mouse to drag and drop said visual part instance from said visual list of choosable part types to said visual part graph application area.

47. The method of claim 28 wherein said user adds said visual part instance by using a touch screen hold and drag gesture, in order to drag said visual part instance from said visual list of choosable part types to said visual part graph application area.

48. The method of claim 28 whereby said visual part graph application is created by computer program automation instead of being created by said user.

49. The method of claim 28 wherein if an attempt is being made to assign said resource that is mutually incompatible with said resource that has also been assigned to same or different said part instance, creation of said resource part type instance is automatically canceled or assigned to an alternate resource.

50. The method of claim 28 wherein if an attempt that is being made to assign said resource requires a specific physical configuration or connection with external electronics, devices or computers, said part graph application designer tool presents a report that identifies the minimum physical configuration or connections required.

51. The method of claim 28 wherein said visual part graph application designer tool includes a testing menu that enables said user to test said part graph application by halting normal execution of said part graph application executable program and manually executing said single step iterator algorithm.

52. The method of claim 51 wherein said visual part graph application designer tool is automatically stepped periodically at a timed rate, whereby said user may visually observe message payload events at a slower speed for testing purposes.

53. The method of claim 51 wherein said visual part graph application area visually displays user editable contents of said final output wire memory blocks.

54. The method of claim 51 wherein a change to said output wire memory block results in a change in the corresponding visual wire highlights, whereby said user may visually monitor program execution.

55. The method of claim 51 wherein a change in said output wire memory block results in an audible sound being produced, whereby said user may audibly monitor program execution.

56. The method of claim 51 wherein said user may instruct said visual part graph application designer tool to halt normal execution of said part graph application executable program when content of said output wire memory block meets arithmetic or logical conditions specified by said user.

* * * * *